(12) United States Patent
Ranous et al.

(10) Patent No.: US 7,293,083 B1
(45) Date of Patent: Nov. 6, 2007

(54) INTERNET USAGE DATA RECORDING SYSTEM AND METHOD EMPLOYING DISTRIBUTED DATA PROCESSING AND DATA STORAGE

(75) Inventors: Alexander C. Ranous, Mountain View, CA (US); Jeffrey D. Meyer, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/559,693

(22) Filed: Apr. 27, 2000

(51) Int. Cl.
*G06F 15/16* (2006.01)

(52) U.S. Cl. .................. 709/224; 709/201; 709/223

(58) Field of Classification Search ............... 709/224, 709/201, 223, 213, 216; 714/2, 702, 48, 714/723, 764, 753; 707/3; 711/163, 167
See application file for complete search history.

(56) References Cited

U.S. PATENT DOCUMENTS

| | | |
|---|---|---|
| 3,512,159 A | 5/1970 | Clark et al. |
| 3,611,423 A | 10/1971 | Rutsche ...................... 346/86 |
| 4,361,877 A * | 11/1982 | Dyer et al. ................ 702/176 |
| 4,516,138 A | 5/1985 | Iwasawa et al. ............. 346/80 |
| 4,819,162 A | 4/1989 | Webb, Jr. et al. .......... 364/401 |
| 4,827,508 A | 5/1989 | Shear ............................ 380/4 |
| 5,155,680 A | 10/1992 | Wiedemer ................... 364/406 |
| 5,255,183 A | 10/1993 | Katz .......................... 364/406 |
| 5,305,238 A | 4/1994 | Starr, III et al. ............ 364/569 |
| 5,321,838 A | 6/1994 | Hensley et al. ............. 395/700 |
| 5,448,729 A | 9/1995 | Murdock .................... 395/600 |
| 5,696,702 A | 12/1997 | Skinner et al. ........ 364/551.01 |
| 5,963,914 A * | 10/1999 | Skinner et al. ............... 705/11 |
| 6,032,132 A | 2/2000 | Nelson ........................ 705/34 |
| 2002/0091636 A1* | 7/2002 | Bullard et al. ................ 705/40 |
| 2002/0091811 A1* | 7/2002 | Schweitzer et al. ......... 709/223 |

OTHER PUBLICATIONS

Chaney, S., "If You Bill Clients By the Hour, TRACKR Can Simplify Your Life," PC Magazine, vll, N1, Jan. 14, 1992, p. 387 (3).

* cited by examiner

*Primary Examiner*—Ario Etienne
*Assistant Examiner*—Barbara Burgess

(57) ABSTRACT

A network usage data recording system and method employing distributed data processing and data storage is described. In one embodiment, the present invention provides a network usage recording system having a multiple level distributed data storage system. The system includes a first network data collector including a first data storage system. A second network data collector is provided including a second data storage system. A data correlator collector is provided including a correlated data storage system. The data correlator collector is in communication with the first data storage system and the second data storage system.

24 Claims, 14 Drawing Sheets

INTERNET USAGE DATA RECORDING SYSTEM AND METHOD EMPLOYING DISTRIBUTED DATA PROCESSING AND DATA STORAGE

CROSS REFERENCE TO RELATED APPLICATIONS

This patent application is related to the following Non-Provisional U.S. patent applications: Ser. No. 09/559,438, entitled "Internet Usage Data Recording System And Method Employing Batch Correlation Of Independent Data Sources," Ser. No. 09/560,509, entitled "Internet Usage Data Recording System And Method With Configurable Data Collector System," and Ser. No. 09/560,032, entitled "Internet Usage Data Recording System And Method Employing A Configurable Rule Engine For The Processing And Correlation Of Network Data," which are all filed on even date herewith, are all assigned to the same assignee as the present application, and are all herein incorporated by reference.

THE FIELD OF THE INVENTION

The present invention relates to a network usage data recording system and method, and more particularly, to a network usage data recording system and method employing distributed data processing and data storage.

BACKGROUND OF THE INVENTION

Network systems are utilized as communication links for everyday personal and business purposes. With the growth of network systems, particularly the Internet, and the advancement of computer hardware and software technology, network use ranges from simple communication exchanges such as electronic mail to more complex and data intensive communication sessions such as web browsing, electronic commerce, and numerous other electronic network services such as Internet voice, and Internet video-on-demand.

Network usage information does not include the actual information exchanged in a communications session between parties, but rather includes metadata (data about data) information about the communication sessions and consists of numerous usage detail records (UDRs). The types of metadata included in each UDR will vary by the type of service and network involved, but will often contain detailed pertinent information about a particular event or communications session between parties such as the session start time and stop time, source or originator of the session, destination of the session, responsible party for accounting purposes, type of data transferred, amount of data transferred, quality of service delivered, etc. In telephony networks, the UDRs that make up the usage information are referred to as a call detail records or CDRs. In Internet networks, usage detail records do not yet have a standardized name, but in this application they will be referred to as internet detail records or IDRs. Although the term IDR is specifically used throughout this application in an Internet example context, the term IDR is defined to represent a UDR of any network.

Network usage information is useful for many important business functions such as subscriber billing, marketing & customer care, and operations management. Examples of these computer business systems include billing systems, marketing and customer relationship management systems, customer churn analysis systems, and data mining systems.

Several important technological changes are key drivers in creating increasing demand for timely and cost-effective collection of Internet usage information. One technological change is the dramatically increasing Internet access bandwidth at moderate subscriber cost. Most consumers today have only limited access bandwidth to the Internet via an analog telephony modem, which has a practical data transfer rate upper limit of about 56 thousand bits per second. When a network service provider's subscribers are limited to these slow rates there is an effective upper bound to potential congestion and overloading of the service provider's network. However, the increasing wide scale deployments of broadband Internet access through digital cable modems, digital subscriber line, microwave, and satellite services are increasing the Internet access bandwidth by several orders of magnitude. As such, this higher access bandwidth significantly increases the potential for network congestion and bandwidth abuse by heavy users. With this much higher bandwidth available, the usage difference between a heavy user and light user can be quite large, which makes a fixed-price, all-you-can-use pricing plan difficult to sustain; if the service provider charges too much for the service, the light users will be subsidizing the heavy users; if the service provider charges too little, the heavy users will abuse the available network bandwidth, which will be costly for the service provider.

Another technological change is the rapid growth of applications and services that require high bandwidth. Examples include Internet telephony, video-on-demand, and complex multiplayer multimedia games. These types of services increase the duration of time that a user is connected to the network as well as requiring significantly more bandwidth to be supplied by the service provider.

Another technological change is the transition of the Internet from "best effort" to "mission critical". As many businesses are moving to the Internet, they are increasingly relying on this medium for their daily success. This transitions the Internet from a casual, best-effort delivery service into the mainstream of commerce. Business managers will need to have quality of service guarantees from their service provider and will be willing to pay for these higher quality services.

Due to the above driving forces, Internet service providers are moving from current, fixed-rate, all-you-can-use Internet access billing plans to more complex billing plans that charge by metrics, such as volume of data transferred, bandwidth utilized, service used, time-of-day, and subscriber class, which defines a similar group of subscribers by their usage profile, organizational affiliation, or other attributes. An example of such a rate structure might include a fixed monthly rate portion, a usage allocation to be included as part of the fixed monthly rate (a threshold), plus a variable rate portion for usage beyond the allocation (or threshold). For a given service provider there will be many such rate structures for the many possible combinations of services and subscriber classes.

Network usage data recording systems are utilized for collecting, correlating, and aggregating network usage information as it occurs (in real time or near real time) and creating UDRs as output that can be consumed by computer business systems that support the above business functions. It may be necessary to correlate different types of network usage data obtained from independent network data sources to obtain information required by certain usage applications.

For billing applications, network usage data is correlated with network session information. Network usage data for a given usage event typically includes a source IP address, a destination IP address, byte count or packet counts (i.e., amount of data transferred across a given connection) and a time stamp. Network usage data does not identify who the user or billing party was that actually performed the action or usage event. Network session information typically includes a source IP address, a time stamp (e.g., start time and end time) and a user name. A usage application for billing purposes requires user names and byte counts. As such, network usage data must be correlated with network session information in order to create a usage record having an association between a billable account and the usage event.

In known usage data recording systems, network usage data received from a network usage data metering source and network session information received from a network session data metering source are fed directly into a central processing system for correlation of the network usage data and network session information. The network usage data and network session information are fed into the central processing system in real time or near real time, as the usage events occur. The network usage data metering source is independent from the network session metering source. The network usage data and network session information is collected and transferred at different rates (i.e., different speeds) and in different data formats, which must be compensated for at the central processing system. It is necessary to provide a queuing process at the central processing system in order to link up the network usage event with the correct network session event. Such queuing often creates a bottleneck at the central processing system. Also, if an error occurs at the central processing system (e.g., loss of power, data fault or other error), data which has not yet been correlated and persistently stored, such as queue data, may be lost.

For reasons stated above and for other reasons presented in greater detail in the Description of the Preferred Embodiment section of the present specification, more advanced techniques are required in order to more compactly represent key usage information and provide for more timely extraction of the relevant business information from this usage information.

SUMMARY OF THE INVENTION

The present invention is a network usage data recording system and method, and more particularly, a network usage data recording system and method employing distributed data processing and data storage.

In one embodiment, the present invention provides a network usage system having a multiple level distributed data storage system. The system includes a set of first level network data collectors. Each first level network data collector receives network accounting data from a network data source, processes and stores the network accounting data at the first level network data collector. A second level network data collector is provided. The second level network data collector receives processed network accounting data from one or more first level network data collectors, processes and stores the network accounting data at the second level network data collector.

The system may further include a third level network data collector. The third level network data collector receives processed network accounting data from the first level network data collector or the second level network data collector, processes and stores the network accounting data at the third level network data collector. The system may include an application interface which receives processed network accounting data from the first level network data collector, the second level network data collector, or the third level network data collector.

In one aspect, the first level network data collector includes a query manager. The second level network data collector is in communication with the first level network data collector via the query manager. In one aspect, the first level network data collector converts the network accounting data to a standard data format. Each first level network data collector includes a first level data storage system and the second level network data collector includes a second level data storage system for storing processed network accounting data.

The first level data storage system and the second level data storage system each include a processed data storage location, a metadata storage location and an error recovery information storage location. The processed network accounting data is stored at the processed data storage location. After storing the processed network accounting data, corresponding metadata is transferred to the metadata storage location and error recovery information is transferred to the error recovery information location.

The first level data storage system includes a first level aging policy. Network accounting data is removed from the first level data storage system after a time period corresponding to the first level aging policy. The second level data storage system includes a second level aging policy different from the first level aging policy, wherein the network accounting data is removed from the second level data storage system after a time period corresponding to the second level aging policy.

In another embodiment, the present invention provides a network usage recording system having a multiple level distributed data storage system. The system includes a first network data collector including a first encapsulator, a first aggregator, and a first data storage system. A second network data collector is provided including a second encapsulator, a second aggregator, and a second data storage system. A data correlator collector is provided including a third encapsulator, a third aggregator, and a third data storage system. The third encapsulator is in communication with the first data storage system and the second data storage system.

The system may further include an aggregator collector, including a fourth encapsulator, a fourth aggregator, and a fourth data storage system. The fourth encapsulator is in communication with the third data storage system. In one aspect, the first data collector receives network data from a network data source. The first aggregator processes the network data. In one aspect, the processing of the network data includes the process of performing data reduction on the network data.

The first data collector receives network data from a network data source. The first encapsulator converts the network data to a standard data format. The first aggregator processes the network data providing aggregated data. The first aggregator includes a defined data transfer interval such that the first aggregator transfers the aggregated data to the first data storage system at the data transfer interval. The data correlator collector includes a defined query interval. The third encapsulator queries the first data storage system for the aggregated data at the query interval. In one aspect, the data transfer interval is a multiple of the query interval.

The first data storage system may include an aggregated data storage location, a metadata storage location and an error recovery information storage location. The aggregated data is stored at the aggregated data storage location. In one aspect, after transfer of the aggregated data to the first data storage system, corresponding metadata is transferred to the metadata storage location and error recovery information is transferred to the error recovery information location.

In another embodiment, the present invention provides a method for recording network usage including storing network data in a multiple level data storage system. The method includes the step of defining a set of first level network data collectors. A first set of network accounting data is received at each first level network data collector. The first network accounting data set is processed and stored at the first level network data collector. A second level network data collector is defined. The first network accounting data set is received from one or more first level network data collectors. The first network accounting data set is processed to produce a second network accounting data set. The second network accounting data set is stored at the second level network data collector.

In one aspect, the method further includes the step of defining a third level network data collector. The second network accounting data set is received at the third level network data collector from the second level network data collector. The second network accounting data set is processed to produce a third network accounting data set. The third network accounting data set is stored at the third level network data collector. The method may further include the step of defining an application interface, and receiving the second network accounting data set at the application interface.

The method further includes the step of defining the first level network data collector to include a query manager. The second level network data collector is in communication with the first level network data collector via the query manager. The step of processing and storing the first network accounting data set via the first level network data collector further includes the step of converting the first network accounting data set to a standard data format. The first level network data collector is defined to include a first level data storage system having a first processed data storage location, a metadata storage location, and an error recovery information storage location. The first network accounting data set is stored at the first processed data storage location. The method may further include the steps of transferring metadata to the metadata storage location and transferring error recovery information to the error recovery information storage location after storing the processed first network accounting data set.

In one aspect, the method further includes the steps of defining a first level aging policy for the first level network data collector, and removing the first network accounting data set from the first level network data collector after a time period corresponding to the first level aging policy. The method may further include the step of defining a second level aging policy for the second level network data collector, wherein the second level aging policy is different than the first level aging policy.

Although the term network is specifically used throughout this application, the term network is defined to include the Internet and other network systems, including public and private networks that may or may not use the TCP/IP protocol suite for data transport. Examples include the Internet, Intranets, extranets, telephony networks, and other wire-line and wireless networks. Although the term Internet is specifically used throughout this application, the term Internet is an example of a network and is used interchangeably herein. The terms network data and network accounting data are used to include various types of information associated with networks, such as network usage data and network session data. The term "normalized metered event" as used herein refers to a standard or universal data format, which allows data to be useable by multiple components.

DESCRIPTION OF THE PREFERRED EMBODIMENTS

In the following detailed description of the preferred embodiments, reference is made to the accompanying drawings that form a part hereof and show, by way of illustration, specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
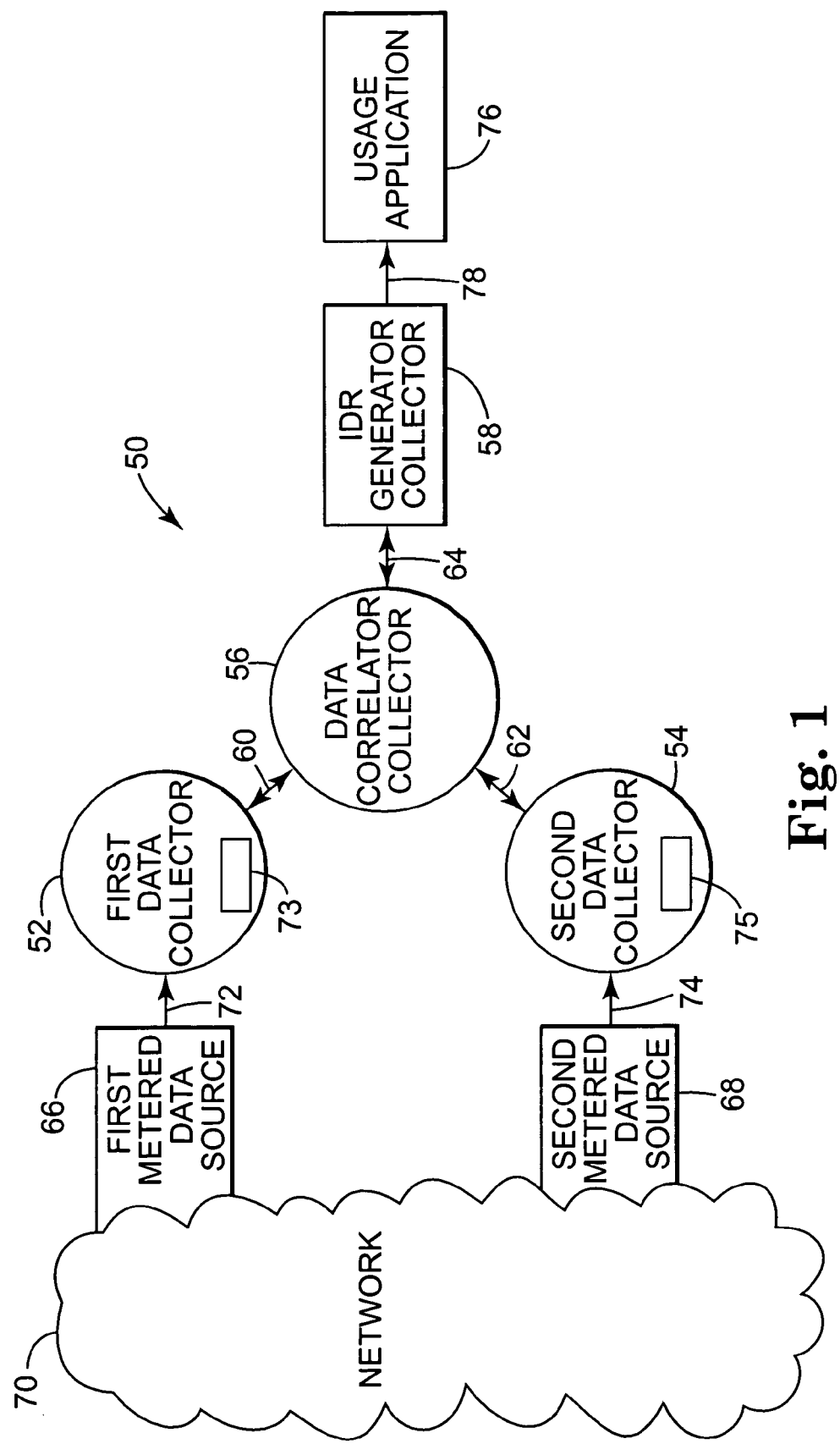
FIG. 1 is a block diagram illustrating one exemplary embodiment of a network usage data recording system according to the present invention.

A network usage data recording system according to the present invention is illustrated generally at 50 in FIG. 1. Network usage data recording system 50 and other embodiments of the network usage data recording system according to the present invention include several main components, each of which is a software program. The main software program components of the network usage data recording system according to the present invention run on one or more computer or server systems.

In one embodiment, each of the main software program components runs on its own computer system. In other embodiments, the main software program components run concurrently on the same computer system. In one aspect, at least a portion of each software program is written in Java programming language, and each of the main components communicate with each other using a communication bus protocol, which in one embodiment is common object request broker architecture (CORBA) based. Other programming languages and communication bus protocols suitable for use with the present invention will become apparent to one skilled in the art after reading the present application.

Network usage data recording system 50 provides a system and method which employs batch correlation of data from independent data sources. In one embodiment, network usage data recording system 50 includes a first data collector 52, a second data collector 54, a data correlator collector 56 and an internet data record (IDR) generator 58. First data collector 52 is coupled to data correlator collector 56 via communication link 60. Second data collector 54 is coupled to data correlator collector 56 via communication link 62. Data correlator collector 56 is coupled to IDR generator 58 via communication link 64. In one embodiment, first data collector 52, second data collector 54, data correlator collector 56 and IDR generator 58 communicate via a standard bus communication protocol. In one exemplary embodiment, the standard bus protocol is a CORBA-based bus protocol.

In operation, first metered data source 66 and second metered data source 68 provide communication data (i.e., network usage information) for communication sessions over the network 70. The network usage information does not include the actual information exchanged in a communication session between parties, but rather includes meta-data (data about data) information about the communication session, such as the session start time and stop time, source or originator of the session, destination of the session, responsible party for accounting purposes, type of data transferred, amount of data transferred, quality of service delivered, etc.

In one exemplary embodiment, network 70 is the Internet, first metered data source 66 is a usage data source and second metered data source 68 is a session data source. First data collector 52 receives a first set of network data 72 from first metered data source 66. The first set of network data 72 is a set of network usage information records of events. First data collector 52 converts the first set of network data 72 to a standard data format usable by the data correlator collector 56. In one preferred embodiment, the standard data format is a normalized metered event (NME). The first data collector 52 stores the first set of network data as a first set of NMEs 73. The NME data format is described in detail later in this application.

Second data collector 54 receives a second set of network data 74 (e.g. a data stream) from second metered data source 68. The second set of network data 74 is a set of network usage information records or events. In one exemplary embodiment, second metered data source 68 is a session data source. The second data collector 54 converts the second set of network data 74 to the standard format, which in one exemplary embodiment is a set of NMEs. The second data collector 54 stores the second set of network data as a second set of NMEs 75. Data correlator collector 56 queries the first data collector 52 for the first set of NMEs 73 via communication link 60. Next, the data correlator collector 56 and queries the second data collector 54 for the second set of NMEs 75 via communication link 62. The data correlator collector 56 correlates the first set of NMEs 73 with the second set of NMEs 75 to define a set of correlated NME data.

Data correlator collector 56 provides for batch correlation of the network data collected via first data collector 52 and second data collector 54. As such, the data does not have to be correlated in real time or near real time (i.e., as the data is collected). The data correlator collector 56 queries the first data collector 52 and second data collector 54 for network data at a desired time, wherein the queried network data is associated with a desired time interval. The data correlator collector 56 may include a preset query interval which may be set to a predefined time interval (e.g., every 15 minutes). Since the data is not required to be correlated in real time or near real time, first data collector 52 and second data collector 54 continue to collect, process and store data independent of the correlation process of data correlator collector 56. Batch correlation by data correlator collector 56 does not require additional processes necessary to handle a real time flow of data from first data collector 52 and second data collector 54, such as a queuing process.

First data collector 52 has the ability to perform processing of network data including data reduction before the data is received by data correlator collector 56. Similarly, second data collector 54 can perform processing of network data including data reduction before the data is received by data correlator collector 56. Data correlator collector 56 stores the correlated data output. IDR generator collector 58 queries the data correlator collector 56 for the correlated data output, and converts the correlated data to a data format usable by usage application 76. Typical usage applications 76 may include billing systems, strategic marketing, capacity planning or data mining systems.

Figure 2:
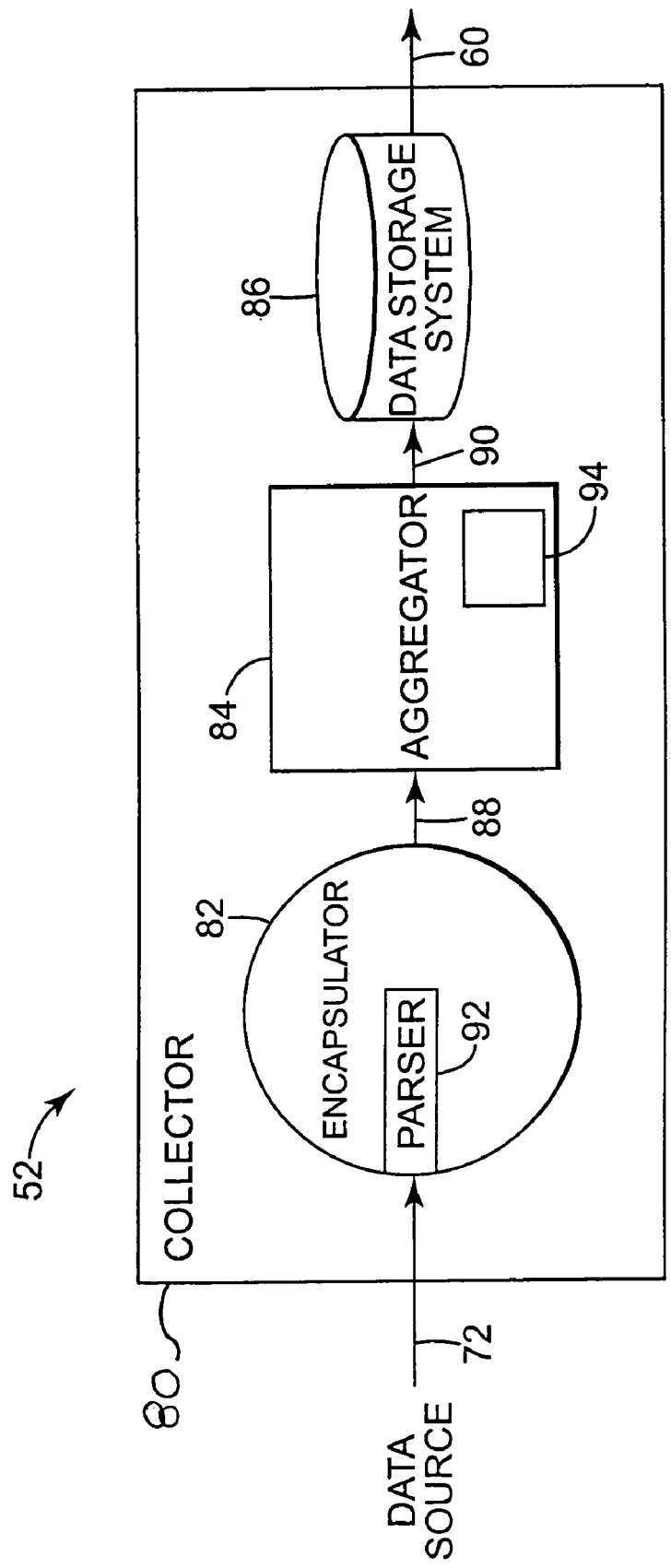
FIG. 2 is a block diagram illustrating one exemplary embodiment of a collector for use with a network usage data recording system according to the present invention.

In FIG. 2, a block diagram is shown illustrating one exemplary embodiment of a collector used in the network usage data recording system 50 according to the present invention. The collector 80 is a configurable collector. As such, collector 80 can be configured to operate as first data collector 52, second data collector 54, data correlator collector 56 or IDR generator collector 58. For discussion purposes, the collector is described herein in reference to first data collector 52. Collector 52 includes an encapsulator 82, an aggregator 84 and a data store 86. Encapsulator 82 receives a first set of network data 72 from first metered data source 66. The first set of network data 72 is in a data format which is collected by first metered data source 66 (i.e., a raw data format). Encapsulator 82 operates to convert the data into a standard data format useable by data correlator collector 58. In particular, encapsulator 82 is configured to receive the data in the first set of network data 72 in its native format, and includes parser 92 which operates to "parse" or separate out the data for converting it into fields of a standard data format. In one preferred embodiment, the standard data format is a normalized metered event (NME) format. Aggregator 84 receives the NMEs from encapsulator 82 and operates to "aggregate" or process the NMEs, and temporarily stores the aggregated NMEs at storage location 94. The aggregated NMEs are periodically flushed to data storage system 86. Data storage system 86 may consist of a storage location on a disk surface of a disk drive or other persistent data storage. Upon being queried by data correlator collector 56, the aggregated NMEs are "flushed" from data storage system 86 and read by or transferred to data correlator collector 56.

Figure 3:
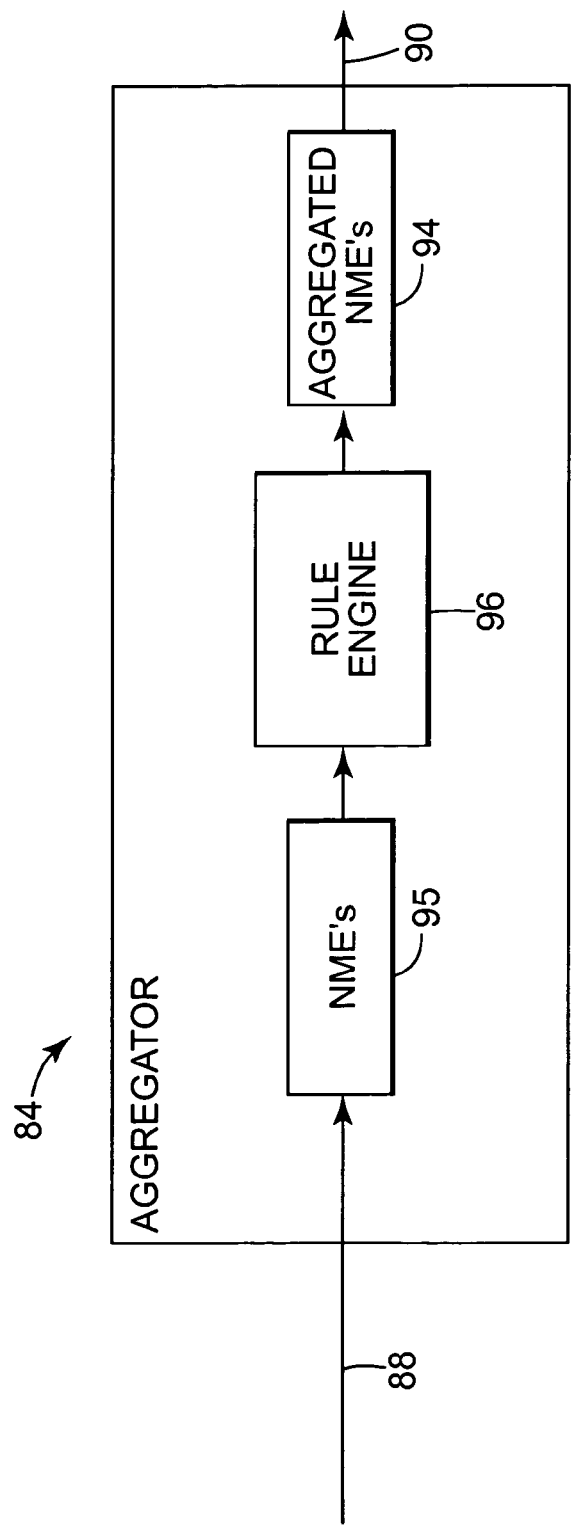
FIG. 3 is a block diagram illustrating one exemplary embodiment of an aggregator for use with a network usage data recording system according to the present invention.

In FIG. 3, a block diagram is shown illustrating one exemplary embodiment of aggregator 84. Aggregator 84 includes a rule engine 96. The set of NMEs 95 received by aggregator 84 are "aggregated" or processed according to rule engine 96. Rule engine 96 operates to process the NMEs according to a predefined aggregation scheme or a set of rules. For example, aggregator 84 may operate to correlate, combine, filter or adorn (i.e., to populate additional fields in an NME) the NMEs according to a predefined rule set. The processing of NMEs via an aggregator using a rule engine or rule scheme is described in detail later in this application.

Figure 4:
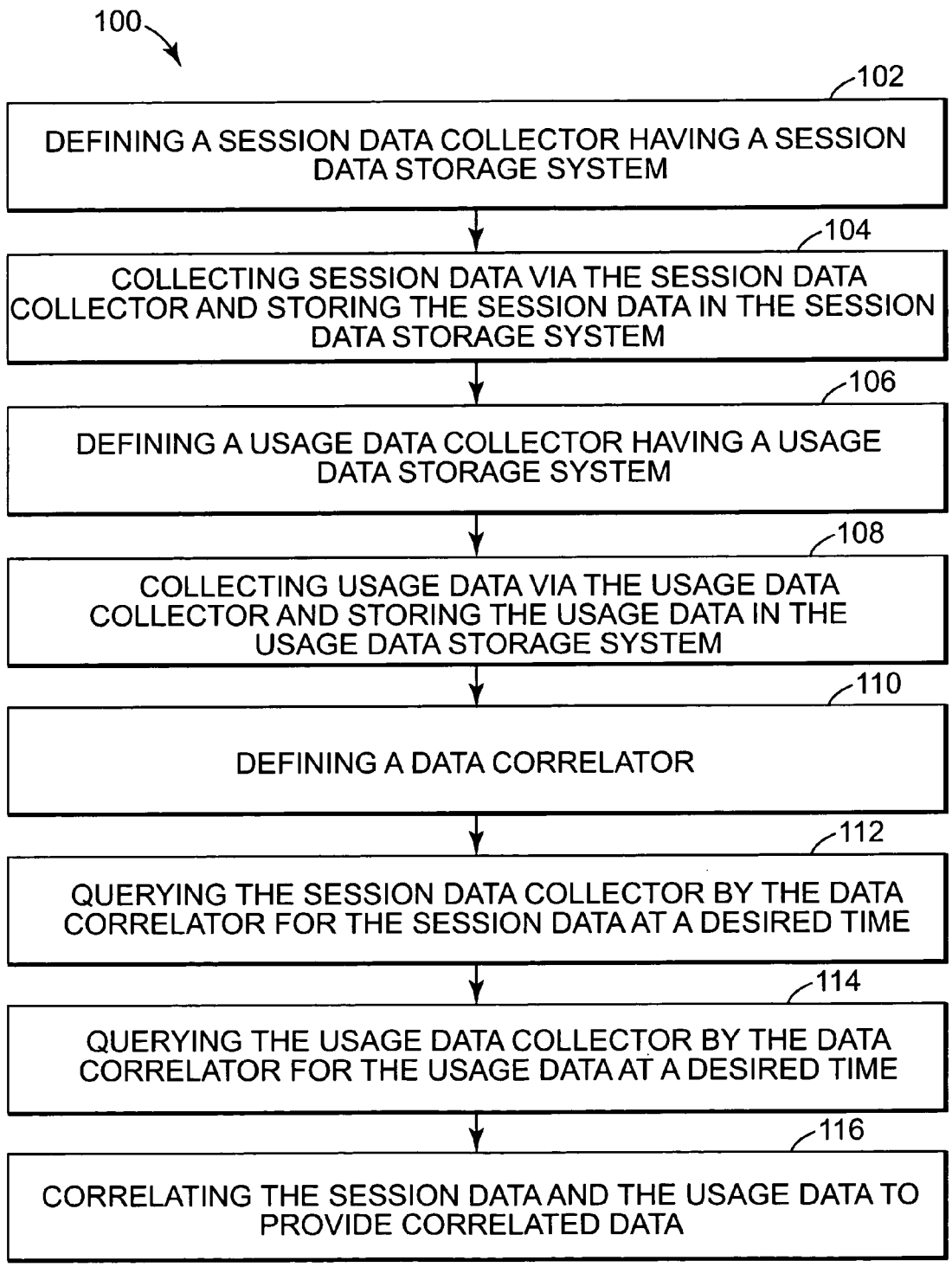
FIG. 4 is a flow diagram illustrating one exemplary embodiment of a method for recording network usage including batch correlating usage data and session data, using the network usage data recording system according to the present invention.

FIG. 4 is a flow diagram illustrating one exemplary embodiment of a method for recording network usage, including batch correlating session data and usage data, according to the present invention, indicated generally at 100. Reference is also made to the network usage recording system 50 of FIG. 1. The method includes defining a session data collector having a session data storage system, indicated at 102. In step 104, the method includes collecting session data via the session data collector and storing the session data in the session data storage system. In step 106, a usage data collector is defined having a usage data storage system. In step 108, usage data is collected via the usage data collector. The usage data is stored in the usage data storage system.

In step 110, a data correlator is defined. In step 112, the session data collector is queried by the data correlator for the session data at a desired time. In step 114, the usage data collector is queried by the data correlator for the usage data at a desired time. In step 116, the session data and the usage data are correlated to provide correlated data.

Figure 5:
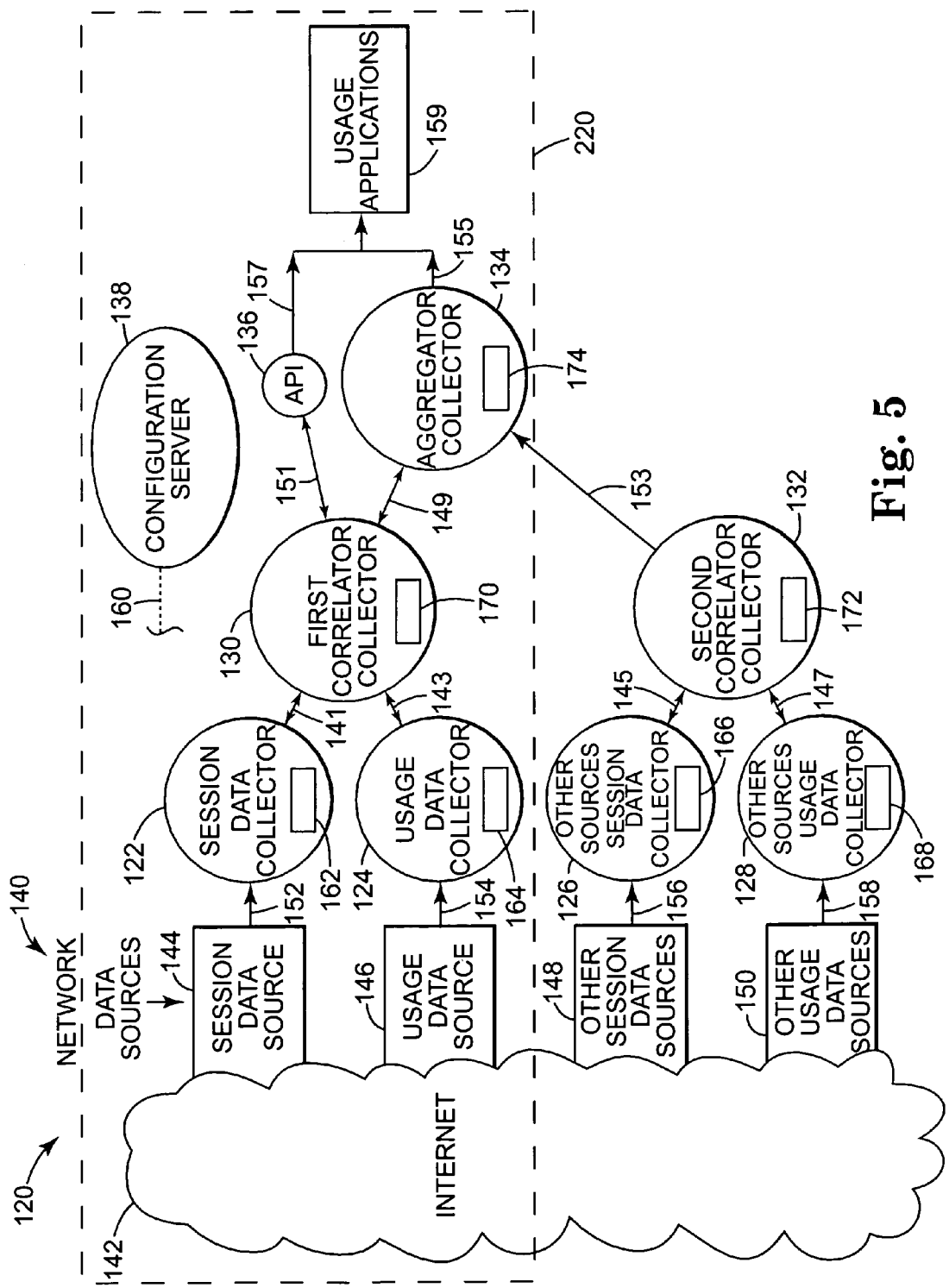
FIG. 5 is a block diagram illustrating another exemplary embodiment of a network usage data recording system according to the present invention.

In FIG. 5, a block diagram is shown illustrating another exemplary embodiment of a network usage data recording system 120. The network usage data recording system 120 is similar to the network usage data recording system 50 previously described herein. The network usage data recording system 120 provides a system and method which employs batch correlation of data from independent sources. In one embodiment, network usage data recording system 120 includes session data collector 122, usage data collector 124, other sources session data collector 126, other sources usage data collector 128, first correlator collector 130, second correlator collector 132, aggregator collector 134, API 136 and configuration server 138. In one embodiment, the devices within network usage data recording system 120 communicate with each other using a bus protocol, and more preferably, a standard bus protocol, and in one preferred embodiment, the standard bus protocol is a CORBA bus protocol.

In the exemplary embodiment shown, network usage data recording system 120 receives raw data from network data sources 140. The network data sources 140 are positioned at various points on the Internet 142 to receive raw network usage data (i.e., data in its native format). In one exemplary embodiment shown, the network data sources 140 include a session data source 144, usage data sources 146, other session data sources 148 and other usage data sources 150. The network data sources 140 provide raw usage data to session data collector 122, usage data collector 124, other sources session data collector 126 and other sources usage data collector 128, indicated by communication links 152, 154, 156 and 158.

In one aspect, session data source 144 is a fixed IP session source (e.g., subscriber management system) which provides a flat file for associating or mapping IP addresses or ranges of IP addresses to a billable account number or other billable entity. In one aspect, usage data collector 124 is a Cisco NetFlow enabled router which provides raw network usage data via a continuous stream of UDP packets or records which contain usage information such as source IP address, destination IP address, port number, direction, protocol, etc. Other session data sources 148 may include other session data from RADIUS, DHCP, LDAP or Database lookup. Other usage data sources 150 provide raw usage data provided from SNMP, service access logs, network probes, firewalls, etc.

Session data collector 122 is in communication with first correlator collector 130 via communication link 141. Usage data collector 124 is in communication with first correlator collector 130 via communication link 143. Other sources session data collector 126 is in communication with second correlator collector 132 via communication link 145. Other sources usage data collector 128 is in communication with second correlator collector 132 via communication link 147. First correlator collector 130 is in communication with aggregator collector 134 via communication link 149, and is in communication with API 136 via communication link 151. Second correlator collector 132 is in communication with aggregator collector 134 via communication link 153. Aggregator collector 134 and API 136 are in communication with usage applications 159 via communication links 155, 157, respectively. Configuration server 138 is in communication with session data collector 122, usage data collector 124, other sources session data collector 126, other sources usage data collector 128, first correlator collector 130, second correlator collector 132, aggregator collector 134 and API 136 via communication bus 160.

Session data collector 122 queries session data source 144 for raw session data. Session data collector 122 receives the raw session data and converts the raw session data to a standard format. In one preferred embodiment, session data collector 122 converts the raw session data to NMEs. Session data collector 122 may also perform other processing operations on the session data, such as data reduction, and stores the session data in data storage system 162. Similarly, usage data collector 124 queries usage data source 146 for raw usage data. The usage data collector 124 receives the raw usage data from usage data source 146 and converts the raw usage data from its native format to an NME format. Usage data collector 124 may also further process the usage data, such as performing data reduction on the usage data. The usage data is then stored in usage data storage system 164. Other sources session data collector 126 queries other session data sources 148 for raw session data. Other sources session data collector 126 receives the session data from other session data sources 148 in raw form and converts it to a standardized data format, which in one preferred embodiment is an NME format. Other sources session data collector 126 may further process the session data, such as performing data reduction operations on the session data. The session data is then stored in session data storage system 166. Other sources usage data collector 128 receives and processes other usage data from other usage data sources 150 in a similar manner, and stores the usage data in data storage system 168.

First correlator collector 130 queries session data collector 122 for session data stored in session data storage system 162, and processes the session data. First correlator collector 130 queries usage data collector 124 for usage data stored in usage data storage system 164 and processes the usage data. In particular, the session data is correlated with the usage data, and the correlated data is stored in first correlator data storage system 170.

Similarly, second correlator collector 132 queries other sources session data collector 126 for the session data stored in session data storage system 166. Next, second correlator collector 132 queries the other sources usage data collector 128 for other data stored in other data storage system 168. The data is correlated in second correlator collector 132 and stored in second correlator collector data storage system 172. Aggregator collector 134 queries the first correlator collector 130 for correlated data stored in data storage system 170, and queries second correlator collector 132 for correlated data stored in data storage system 172. The aggregator collector 134 operates to correlate the two sets of data, and convert the data to a data format necessary for the specific usage application 158. In one embodiment, the aggregator collector converts the correlated data sets to an internet data record (IDR) format and stores the IDRs in aggregator collector storage system 174. The stored IDRs are available for use by usage application 158. Alternatively, API 136 may directly query the correlated data stored in data storage system 170, and provide the output to usage application 158.

In one preferred embodiment, the network usage data recording system 120 is a flexible, configurable system. The session data collector 122, usage data collector 124, other sources session data collector 126, other sources usage data collector 128, first correlator collector 130, second correlator collector 132, aggregator collector 134 (hereinafter as a group referred to as "collectors") are all formed from the same modular collector components (i.e., an encapsulator, an aggregator, and a data storage system). Each component that makes up each of these collectors is individually configurable. The configuration information for each of these collectors is stored at a centralized location at the configuration server 138, and managed by configuration server 138. At start-up, the collectors query the configuration server 138 to retriever their configuration. Other applications that interact with the collectors also query the configuration server to locate the collectors.

Collector Architecture

Figure 6:
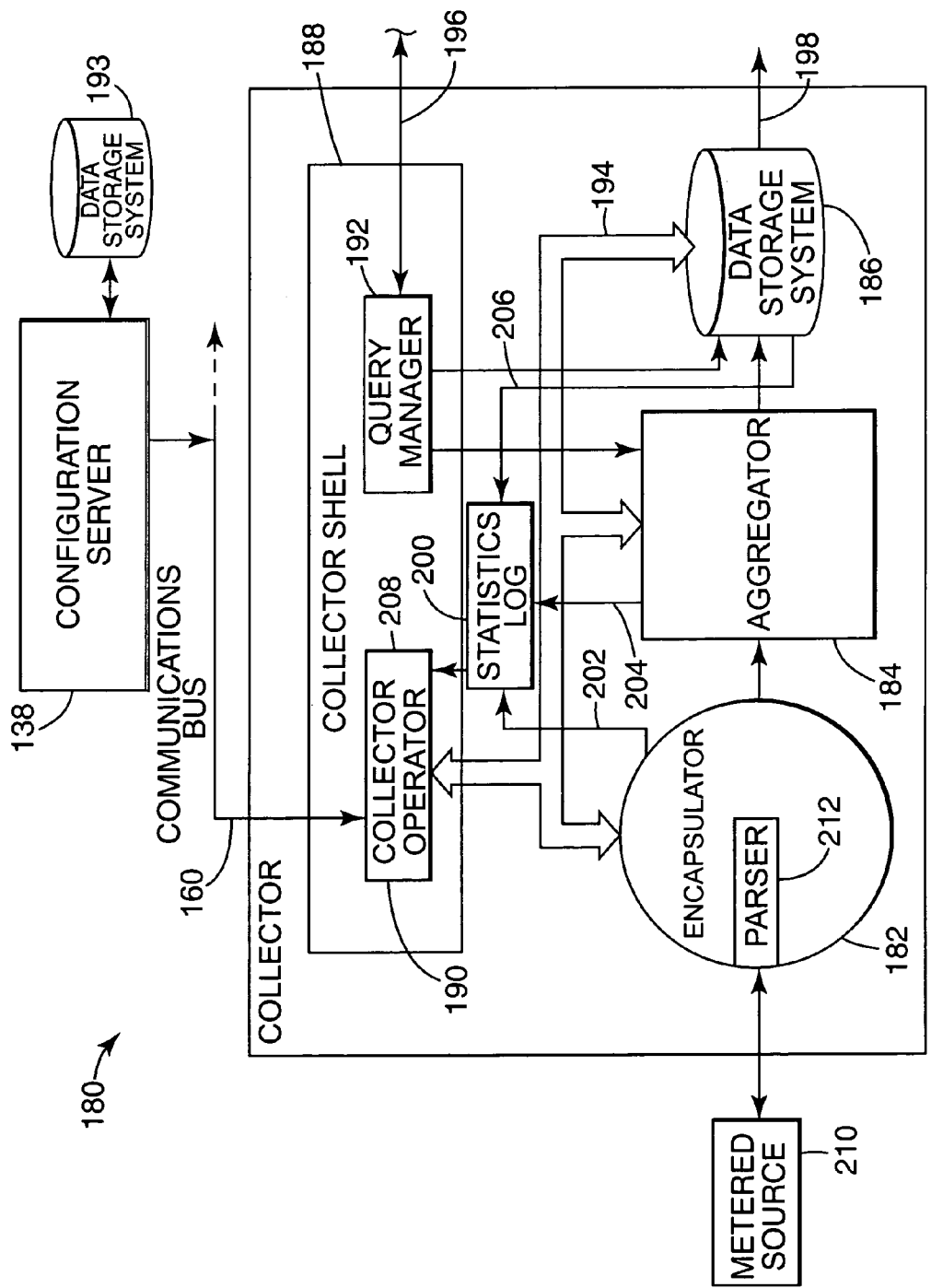
FIG. 6 is a block diagram illustrating another exemplary embodiment of a collector for use with a network usage recording system according to the present invention.

Collectors 122, 124, 126, 128, 130, 132, 174 are made up of three configurable components and are similar to the collectors previously described herein. In FIG. 6, a block diagram is shown illustrating one exemplary embodiment of the base architecture for each of the configurable collectors 122, 124, 126, 128, 130, 132. The collector architecture allows the same basic components to be used to perform different functions within the network usage data recording system based on how they are configured. As such, the collector 180 can be configured to operate as a data collector, a correlation collector ("a collector of collectors"), an aggregator collector, etc. In one preferred embodiment, the collector is defined by a configurable Java object class.

Collector 180 includes an encapsulator 182, an aggregator 184, and a data storage system 186. The encapsulator 182 operates to read raw usage information from a metered source and convert it to a standard data format, and in particular, convert it to normalized metered events (NMEs). The encapsulator 182 is configurable for reading and converting usage data from a variety of data sources. The aggregator 184 processes the NMEs. This mainly involves combining like NMEs together to achieve data reduction, but may also include other processing such as filtering and adorning the data by adding or modifying attributes in the NMEs. The aggregator 184 operates to periodically flush the NMEs to the data storage system 186. The data storage system 186 is responsible for storing the NMEs. The data storage system 186 also supports queries so other collectors or applications can retrieve specific sets of data (e.g., for specific time intervals) from the data storage system 186.

The encapsulator 182, aggregators 184 and data storage system 186 are each separately configurable components of collector architecture 180. As such, each component can be changed without impacting the other components. The configuration server 138 stores configuration data for each collector and data storage system 193.

Collector 180 further includes a collector shell 188 in communication with encapsulator 182, aggregator 184 and data storage system 186. In particular, collector shell 188 includes collector operator 190 and query manager 192. Collector operator 190 is in communication with encapsulator 182, aggregator 184 and data storage system 186 via communication bus 194. Collector shell 188 operates as an interface between configuration server 138 and encapsulator 182, aggregator 184 and data storage system 186. At start-up, the collector shell 188 queries the configuration server to retrieve the configuration data from configuration server 138 that is specific to collector 180, for encapsulator 182, aggregator 184 and data storage system 186.

Query manager 192 operates as an interface between data storage system 186 and/or aggregator 184 and other collectors which query data storage system 186 to obtain usage data stored therein. The query manager 192 communicates with other collectors or applications via communication link 196. Alternatively, data storage system 186 may be directly accessed via communication link 198.

Collector 180 may also include a statistics log 200. Statistics log 200 is in communication with encapsulator 182, aggregator 184, data storage system 186 and collector operator 190, indicated by links 202, 204, 206, 208. Statistics log 200 logs statistical data from encapsulator 182, aggregator 184 and data storage system 186. Exemplary statistical data includes number of NMEs generated by the encapsulator, number of NMEs in the aggregation tree, number of NMEs written to datastore in last flush, error counts, etc. The statistics log 200 can be queried by configuration server 138 via collector operator 190, for recording of logged statistics.

Encapsulator 182 reads metered usage information from a metered source 210 (e.g., network data sources 144, 146, 148, 150). The encapsulator 182 converts the usage information to normalized metered events (NMEs). The function of encapsulator 182 is configurable based on the type of usage information it receives and converts into NMEs. In one exemplary embodiment, the types of encapsulators include a demo encapsulator, a rolling file encapsulator, a directory encapsulator, a UDP encapsulator, a telnet encapsulator, an SNMP encapsulator, a collector encapsulator and a polling mux encapsulator. The demo encapsulator allows a stream of NMEs to be generated. The fields in the NMEs and their values can be controlled. This type of encapsulator is useful for demonstrating the network usage data recording system, testing aggregation schemes and internet data record formatting. The rolling file encapsulator reads event data from log files and produces NMEs to be aggregated (data reduction) at the aggregator level. The directory encapsulator reads event data from all the files in a directory, and then quits. This type of encapsulator can be used for batch processing.

The UDP encapsulator reads event data exported by certain network devices and produces NMEs to be processed by the aggregator 184. One suitable network encapsulator processes NetFlow datagrams that are exported by any NetFlow enabled device. The telnet encapsulator attaches to a system via telnet commands and issues certain accounting commands to retrieve usage information. One embodiment of using this encapsulator is the retrieval of IP accounting from routers commercially available under the trade name CISCO. The SNMP encapsulator is used to retrieve event data from a source via SNMP. The collector encapsulator retrieves NME data that has already been processed by other collectors. This type of encapsulator could be used in a correlator collector or an aggregator collector. The polling mux encapsulator can run several polling based encapsulators (the collector encapsulator, telnet encapsulator or SNMP encapsulator) in parallel. Correlators use this type of encapsulator. The attributes for the above encapsulators define how NMEs are obtained from an input log file, network or other collectors.

In one embodiment, encapsulator 182 includes parser 212, the role of parser 212 is to parse event data received by the encapsulator and create an NME to be processed by aggregator 184. The NMEs are made up of attributes such as a usage records start time, end time, source IP address, destination IP address, number of bytes transferred, user's login ID and account number, etc. The parser 212 is configured to recognize event fields from the input source and map each one (i.e., normalize them) to an NME format. Alternatively, an encapsulator may not need a parser.

NMEs are composed of attributes that correspond with various fields of some network usage event. The attributes can be of several different types, depending on what type of data is being stored. In one exemplary embodiment, the network usage data recording system may include the following attribute types:

| Type | Description |
| --- | --- |
| StringAttribute | Used to store ASCII text data |
| IntegerAttribute | Used to store 32 bit signed integers |
| IPAddrAttribute | Used to store an IP address |
| TimeAttribute | Used to store a date/time |
| LongAttribute | Used to store 64 bit signed integers |
| FloatAttribute | Used to store 32 bit single precision floating point numbers |
| DoubleAttribute | Used to store 64 bit double precision floating point numbers |

Each NME attribute (i.e., NME field) is mapped to an attribute type. The following table lists one exemplary embodiment of NME attribute names, with their associated type and description.

| Names | Type | Description |
| --- | --- | --- |
| StartTime | TimeAttribute | The time the event began |
| EndTime | TimeAttribute | The time the event ended |
| SrcLP | IPAddrAttribute | The IP address of the sender |
| DstLP | IPAddrAttribute | The IP address of the receiver |
| SrcPort | IntegerAttribute | The port number of the sender |
| DstPort | IntegerAttribute | The port number of the receiver |
| NumPackets | IntegerAttribute | The number of packets |
| NumBytes | IntegerAttribute | The number of bytes |
| SrcIPStart | IPAddrAttribute | The start of a range of IP addresses |
| SrcIPEnd | IntegerAttribute | The end of a range of IP addresses |
| TxBytes | IntegerAttribute | The number of bytes transmitted |
| RxBytes | IntegerAttribute | The number of bytes received |
| TxPackets | IntegerAttribute | The number of packets transmitted |
| RxPackets | IntegerAttribute | The number of packets received |
| SrcAS | IntegerAttribute | The autonomous system number of the source |
| DstAS | IntegerAttribute | The autonomous system number of the destination |
| SrcPortName | StringAttribute | The string name of the source port |
| DstPortName | StringAttribute | The string name of the destination port |
| LoginState | StringAttribute | The state of a login event |
| RouterID | Attribute | The router ID of the router producing the event |
| LoginID | StringAttribute | The login ID of the user producing the event |
| AcctNum | StringAttribute | The account number of the entity responsible for the event |

Other NME attributes may be utilized. Other NME attributes will become apparent to those skilled in the art after reading the present application.

Aggregator 184 receives a stream of NMEs from encapsulator 182 and operates to process, filter, and organize the NME data. Typically, the aggregator process results in a reduction in the amount of data. In particular, each normalized metered event collected at the encapsulator 182 is pushed to the aggregator 184 and stored in an aggregation tree. The aggregator 184 creates the aggregator tree. How the nodes or branches of the aggregation tree are established depends on a set of configurable rules, termed a rule chain. Rules in a rule chain are applied to inbound NMEs by the rule engine, a logical entity existing in the aggregator. The bottom nodes or "leaf" nodes of each aggregation tree are termed aggregated NMEs. The aggregated NMEs are stored in data storage system 186.

How often the aggregated NMEs are stored in the data storage system 186 depends on a configurable policy called a "flush policy". When NMEs are stored to the data storage system 186, the encapsulator recovery information (ERI) of the last successfully stored NME is also saved in the data storage system 186 to provide a checkpoint for recovery if necessary.

A simple collector consists of a single aggregation scheme containing a single chain of rules to construct an aggregation tree. Alternatively, the collector configuration may include multiple aggregation schemes or a correlation aggregation scheme for correlating collectors. In particular, if it is desired to organize inbound NMEs into multiple aggregation trees, the aggregator can be configured to add additional aggregation schemes under a single collector. In this embodiment, an inbound NME is processed by each rule chain and aggregated into each tree following its separate rule policy. One exemplary use of a multiple aggregation scheme would be for gathering two types of usage data in a single collector. For example, detailed usage data (e.g., grouped by source address, destination address and destination port) may be aggregated using one scheme and summary usage information (e.g., only grouped by port to identify protocol distribution) may be aggregated using another aggregation scheme. The separate aggregation schemes are then stored in separate tables or files in the data storage system (i.e., persistent storage), because each may aggregate different fields from the input NMEs.

In regard to correlation aggregation schemes, correlating usage events with session events is considered a special case of aggregation. In this embodiment, a single aggregation scheme (and aggregation tree) is manipulated using two different rule chains. The first rule chain is used for organizing session NMEs and the second rule chain is used for locating the appropriate session in the tree for inbound usage NMEs. One exemplary embodiment of a simple aggregation scheme and another exemplary embodiment of a correlation aggregation scheme is detailed later in this specification.

A collector's aggregation policy is controlled by its configuration. The configuration for an aggregator is structured as follows:

| | |
|---|---|
| Aggregator | there is always exactly one aggregator object configured per collector. The configuration of this aggregator specifies the aggregation scheme (or schemes) to be used. |
| Flush Policy | the flush policy controls when aggregated NMEs are moved from the in-memory structures to the persistent data storage system. When choosing this policy the cost of recovery is balanced versus the amount of aggregation to be achieved. There is only one flush policy per collector. |
| Aggregation Scheme | There may be one or more aggregation schemes configured for a collector. Each aggregation scheme has a sequence of rules configured that control how the aggregation tree is assembled. In the case of correlation, two rule chains are configured for a single aggregation scheme. |
| Rules | Rules are the building blocks for constructing an aggregation scheme. The rules control how the aggregation tree is constructed, and how NMEs are manipulated and stored as they pass through the aggregation tree. |

Data Storage System

The data storage system 186 has two primary functions. First, the data storage system 186 provides persistent storage of all aggregated NMEs and recovery information. In particular, aggregated NMEs are periodically flushed from the aggregator to the data storage system 186. At that time, recovery information is also persistently stored in the data storage system 186. The recovery information is the collector state information which is used during crash recovery. In particular, where an encapsulator is reading from a file, the recovery information indicates the encapsulator's position in the file at the time the flush occurred. As such, if power is lost and the collector is restarted, the collector operator retrieves the recovery information from the data storage system 186 and sends it to the encapsulator, such that the encapsulator can reposition (or position) itself at the appropriate point in the data storage system the encapsulator is reading from.

In one aspect, there are three types of data storage systems 186. In a first embodiment, the data storage system is used to store both the NMEs themselves as well as metadata related to the stored NMEs in a database. In a second embodiment, the data storage system uses the underlying file system to store the actual NMEs. Metadata related to these NMEs is stored in the data storage system. Significant performance advantages can be achieved with this data storage system when large volumes of NMEs are being stored. In one preferred embodiment, the second type of data storage system is used only with usage sources. The third type of data storage system stores the NMEs in internet data record (IDR) format in ASCII files. IDR formatted output is intended to provide files which are convenient for consumption by external applications. Example formats include character delimited records, HTML tables, XML structures and fixed width fields. The data storage system 186 supports the query manager for allowing clients to obtain aggregated NMEs based on some query criteria.

Distributed Data Storage

Figure 7:
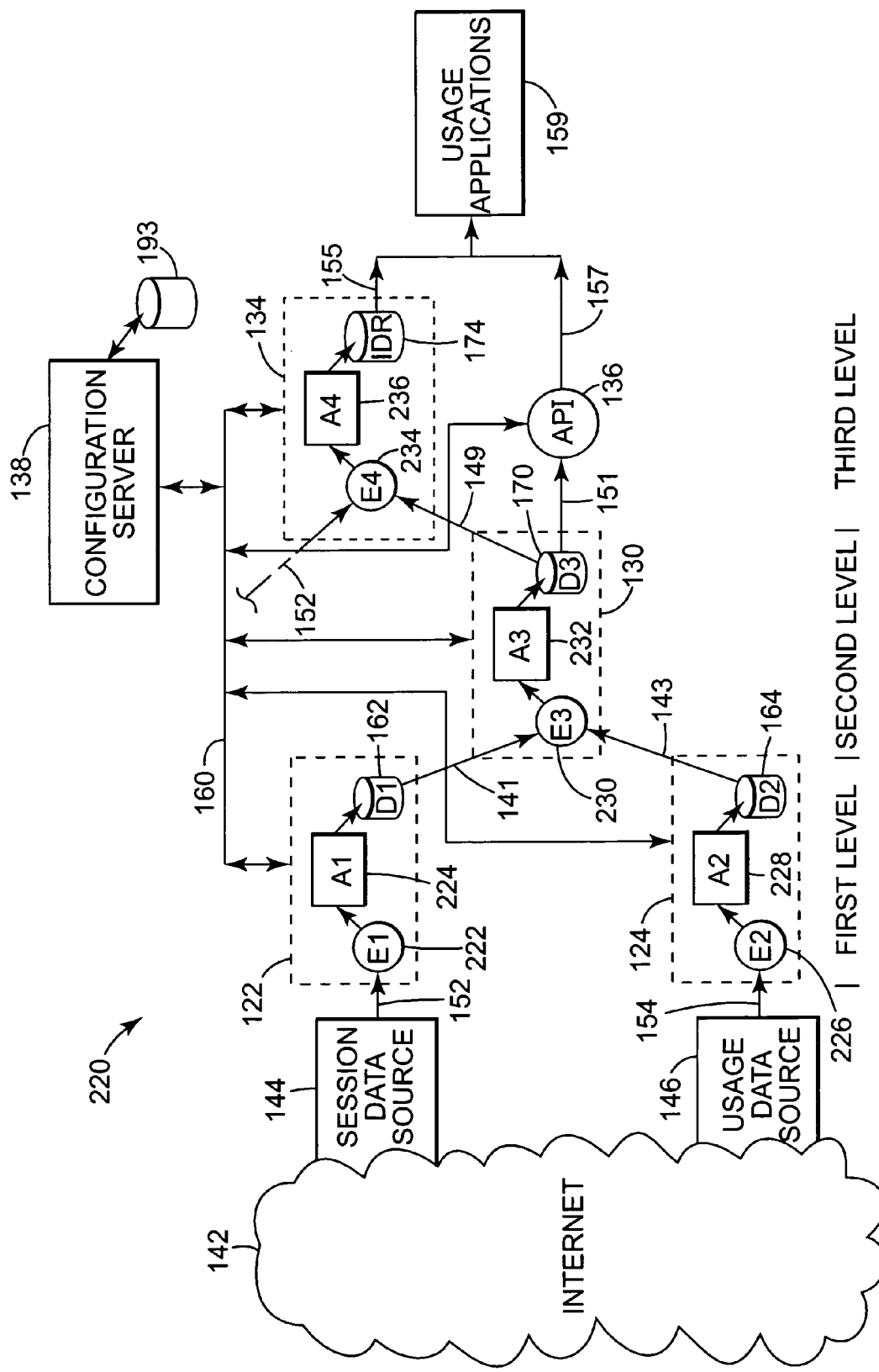
FIG. 7 is a block diagram illustrating a portion of the network usage data recording system of FIG. 5, showing the distributed data storage system features of the present invention.

In FIG. 7, a block diagram is shown illustrating one exemplary embodiment of the network usage data recording system 120 according to the present invention having distributed data storage. The portion of the network usage data recording system 120 shown is indicated by dash line 220 in FIG. 5. For discussion purposes, each collector is represented by its three main components, an encapsulator, an aggregator and a data storage system. In particular, session data collector 122 includes first encapsulator 222 (E1), first aggregator 224 (A1) and first data storage system 162 (D1); usage data collector 124 includes second encapsulator 226 (E2), second aggregator 228 (A2) and second data storage system 164 (D2); first correlator collector 130 includes third encapsulator 230 (E3), third aggregator 232 (A3) and third data storage system 170 (D3); and aggregator collector 134 includes fourth encapsulator 234 (E4), fourth aggregator 236 (A4) and fourth data storage system 174 (IDR).

The network usage data recording system 120 according to the present invention having a distributed data storage system provides for a hierarchy or multiple levels of network data processing and data storage at each level. As shown in FIG. 7, session data collector 122 and usage data collector 124 provide for a first level of data processing and data storage in data storage system 162 and data storage system 164, respectively. First correlator collector 130 provides for a second level of data processing, and in this example, correlation of session data and usage data, and data storage in data storage system 170. Aggregator collector 134 provides for a third level of data processing and data storage in data storage system 174. Each data storage system 162, 164, 170, 174 may comprise a disk drive, a location on a disk surface in a disk drive, or other persistent data storage.

The distributed data storage system of the present invention provides many benefits to the network usage data recording system 120. In particular, the distributed data storage system provides for data processing, reduction, and storage at each collector location, independent of data processing and storage at another location or level. As such, data may be processed at different rates (often depending on the data source) without affecting other processing locations. Data reduction may be performed at each level, which reduces the necessary data storage at the next level. Since the distributed data storage system allows for batch correlation at the next data processing level, data traffic bottlenecks associated with central data storage systems are avoided. The resulting data storage system has more flexibility and is more error resilient.

The network usage data recording system 120 according to the present invention having a distributed data storage system provides a system, collects data or accounting information from a variety of sources and makes that information available in a format (NMEs or other suitable format) that's convenient for some end processing or usage applications. Processing is accomplished at each level and each data storage system preserves its level of intermediate results. The results of a previous level flow through to a next level collector, which after processing stores yet another set of intermediate results. The data stored at each data storage system 162, 164, 170, 174 is available to a collector or other application at each level, but may also be accessed directly by a user. As such the distributed data storage system gives access to a user to the processed data at each level of processing. For example, at the third level API (application programming interface) 136 can directly query any of the data storage systems, 162, 164 or 170 via the CORBA bus 160, and provide the data to an appropriate usage application 158.

In one embodiment, the present invention provides a network usage system 120 having a multiple level distributed data storage system and method for recording network usage including storing network data in a multiple level data storage system. The system 120 includes a set of first level network data collectors 122, 124. Each first level network data collector 122, 124 receives network accounting data from a network data source 144, 146, processes and stores the network accounting data at the first level network data collector 122, 124. A second level network data collector 130 is provided. The second level network data collector 130 receives processed network accounting data from one or more first level network data collectors 122, 124, processes and stores the network accounting data at the second level network data collector 130.

The system may further include a third level network data collector 134. The third level network data collector 134 receives processed network accounting data from the first level network data collector 122, 124 or the second level network data collector 130, processes and stores the network accounting data at the third level network data collector 134. The system may include an application interface 136 which receives processed network accounting data from the first level network data collector 122, 124, the second level network data collector 130, or the third level network data collector 134.

In one aspect, the first level network data collector 122, 124 includes a query manager. The second level network data collector 130 is in communication with the first level network data collector via the query manager. In one aspect, the first level network data collector 122, 124 converts the network accounting data to a standard data format. Each first level network data collector 122, 124 includes a first level data storage system 162, 164 and the second level network data collector 130 includes a second level data storage system 170 for storing processed network accounting data.

Figure 8:
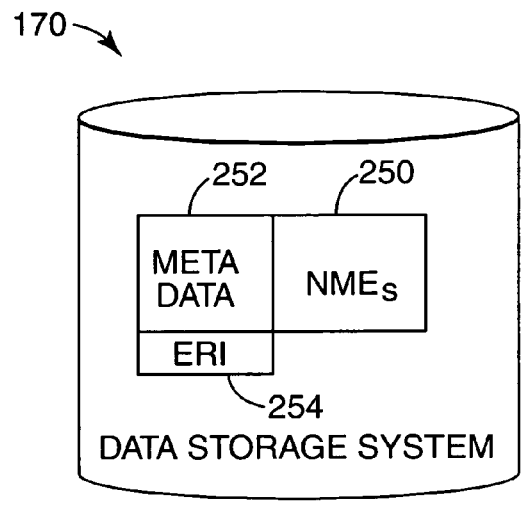
FIG. 8 is a block diagram illustrating one exemplary embodiment of a data storage system for use with a network usage recording system according to the present invention.

The first level data storage system 122, 124 and the second level data storage system 170 each include a processed data storage location 250, a metadata storage location 252 and an error recovery information storage location 254 (shown in FIG. 8). The processed network accounting data is stored at the processed data storage location 250. After storing the processed network accounting data, corresponding metadata is transferred to the metadata storage location 252 and error recovery information 254 is transferred to the error recovery information location.

The first level data storage system 162, 164 includes a first level aging policy. Network accounting data is removed (i.e., deleted) from the first level data storage system 162, 164 after a time period corresponding to the first level aging policy. The second level data storage system 170 includes a second level aging policy different from the first level aging policy, wherein the network accounting data is removed from the second level data storage system 170 after a time period corresponding to the second level aging policy.

Data "Flush" Policy

Each aggregator 224, 228, 232, 236 has a predefined or configured "flush policy." The flush policy or flush interval is defined as the time interval or how often processed or aggregated data is "flushed" or transferred from volatile memory (associated with each aggregator) to persistent storage in corresponding data storage systems 162, 164, 170, 174. Preferably, the flush policy associated with a collector is coordinated with the flush policy at an adjacent level. In particular, encapsulator 234 (third level) queries data storage system 170 (second level). Similarly, encapsulator 230 queries data storage system 162 (first level) and data storage system 164 (first level). As such, the flush policy of aggregator collector 134 is preferably coordinated with the flush policy of first correlator collector 130. Similarly, the flush policy of first correlator collector 130 is preferably coordinated with the flush policy of session data collector 122 and usage data collector 124. When a flush occurs, the collector (e.g., session data collector 122) writes the aggregated NMEs to its local data store and then continues processing data. The queries that are coming from upstream or next level collectors are independent. As such, the upstream collector is actively asking for data which, if the upstream collector's query is not coordinated with the flush policy of the downstream collector, the upstream collector will continue to ask for data until the data is available. As such, preferably the upstream or next level collector queries or retrieves information at an interval that is a multiple of the flush rate of the downstream or previous level collector.

In one example, the predefined flush interval or session data collector 122's aggregator 224 is set to fifteen minute intervals. The query interval for first correlator collector 130's encapsulator 230 is set for one hour intervals. As such, encapsulator 230 will query data storage system 162 for data from 12:00 to 1:00. The encapsulator 230 retrieves this data, which is the result of four data flushes (at fifteen minute intervals) by aggregator 224 to data storage system 162. First level or downstream collector 122 flushes aggregated data to data storage system 162 at fifteen minute intervals, but the second level or upstream collector 130 retrieves the aggregated data at one hour intervals.

Alternatively, the second level collector 130 may query the first level collector 122 for data at intervals which do not coordinate with the flush intervals of the first level collector 122. For example, usage data collector 122 may have a flush interval of fifteen minutes. Upstream or second level first correlator collector 130 may have a query interval of five minutes. This requires the second level first correlator collector 130 to continue to repeatedly query the first level usage data collector 122 until the data is available from data storage system 162. Of course, after a flush occurs, the second level first correlator collector 130 can successfully query and retrieve data for three consecutive five minute intervals, since the first level session data collector 122 has a fifteen minute flush interval.

The distributed data storage system according to the present invention provides transactional integrity for data written to each data storage system 162, 164, 130, 174. In reference also to FIG. 8, a block diagram is shown illustrating one exemplary embodiment of data storage system 170. The discussion of data storage system 170 is equally applicable to the other data storage systems within the network usage data recording system 120. At each flush of data to data storage system 170, three types of information are stored within the data storage system 170. These three types of information include the aggregated data (aggregated NMEs) 250, metadata 252 and error recovery information (ERI), which are persistently stored in data storage system 170. Aggregated data 250 is simply the aggregated data processed by aggregator 232. Metadata 252 is detailed information about the storing of the aggregated data 250. The metadata 252 may include details about when the data flush occurred, the time range of the data which was flushed, and includes a pointer or some other indicator to where the data is stored within the data storage system 170. As such, the transactional integrity of the aggregated data 250 is maintained by metadata 252. Error recovery information 254 may be stored as part of metadata 252 or, alternatively, may be stored separate from metadata 252. If the error recovery information 254 is stored separate from the metadata 252, the metadata 252 may include a pointer or locator to the location of the error recovery information 254 within the data storage system 170. The metadata 252 and error recovery infiltration 254 are only updated after a successful data flush has occurred.

When data storage system 170 is queried by another collector or other application (e.g., the API 136), the querying device looks at the metadata 252 to determine if the desired data is stored in data storage system 170, and if so, the location of that data (i.e., aggregated data 250). In regards to transactional integrity, if an error occurs during the processing of data by aggregator 232 or the flushing of data from aggregator 232 to data storage system 170, the result may be lost data or an incomplete data file written to data storage system 170. As such, the metadata 252 and error recovery information 254 was not changed. Collector 130 looks at the metadata 252 and error recovery information 254, determines the location of the data for the last complete flush. The collector 130 gives the error recovery information to the encapsulator 230 such that the encapsulator can position itself in the data source (e.g., data storage system 162) at the appropriate point to retrieve the lost data.

Aggregator Rule Engine

Figure 9:
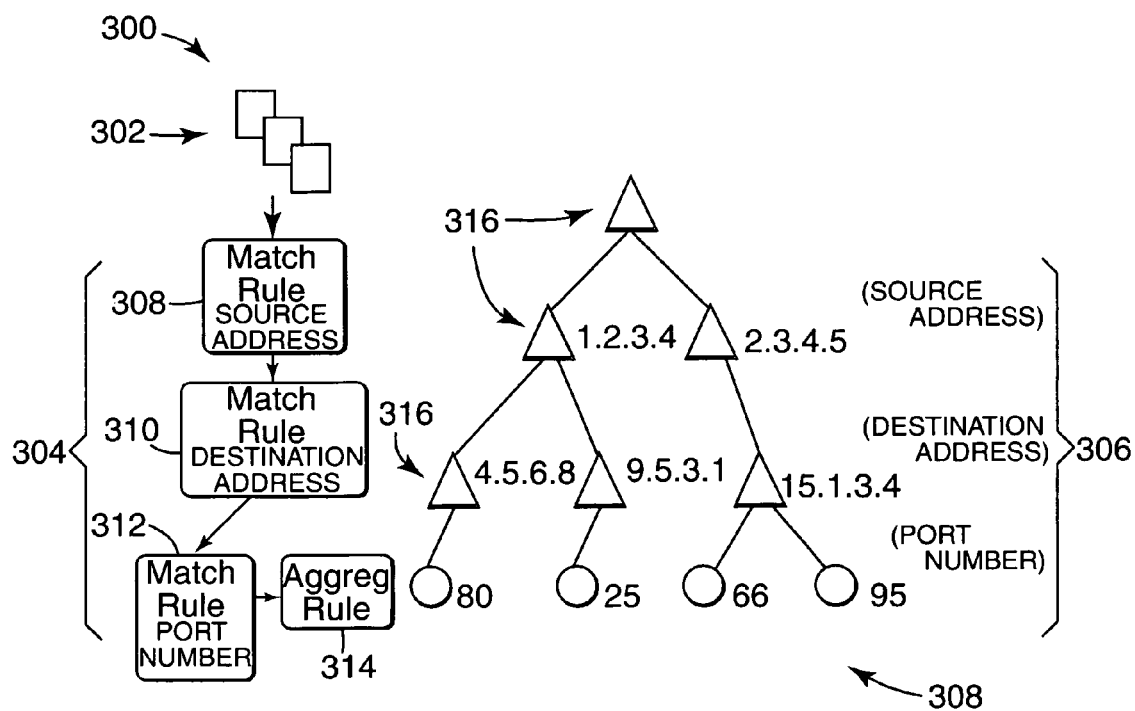
FIG. 9 is a block diagram illustrating one exemplary embodiment of a simple aggregation scheme used in a network usage data recording system according to the present invention.

The following paragraphs describe exemplary operation of the aggregators for processing network data which is in the form of NMEs, and in particular, for processing network data via an aggregator rule engine which process the network data according to a rule chain. Reference is also made to the discussion regarding the previous FIGS. 1-8. FIG. 9 is a block diagram illustrating one exemplary embodiment of a simple aggregation scheme, illustrated generally at 300. Inbound network data NMEs are indicated at 302. An aggregation rule chain is indicated at 304, and an aggregation tree is indicated at 306. In summary, the stream of inbound network data NMEs is processed by the rule chain 304 in order to construct an aggregation tree 306. The product of the aggregation tree 306 are aggregated NMEs which are ultimately flushed to the associated data storage system.

Rule chain 304 includes a set of individual rules 308, 310, 312, 314 which operate on each inbound network data NME 302. In aggregation tree 306, NME groups 316 are indicated as triangles and aggregated NMEs 318 are indicated as circles. The match rules within the rule chain 304 are used to organize the network data NMEs according to fields which they contain. In the exemplary embodiment shown, match rule 308 matches on source address, match rule 310 matches on destination address and match rule 312 matches on destination port number, to create the aggregation tree.

In one exemplary embodiment, the present invention provides a network usage recording system and method for recording network usage. The method includes the step of defining a network data collector 144, 146 including an encapsulator 222, 226, an aggregator 224, 228 and a data storage system 162, 164. A set of network accounting data 302 is received via the encapsulator 222, 226. The network accounting data set 302 is converted to a standard data format (e.g., NMEs). The network accounting data set is processed via the aggregator 224, 228, including the steps of defining a rule chain 304 and applying the rule chain 304 to the network accounting data set 302 to construct an aggregation tree 306 including creating an aggregated network accounting data set 308. The aggregated network accounting data set 308 is stored in the data storage system 162, 164.

The step of applying the rule chain 304 to the network accounting data set 302 to construct the aggregation tree 306 includes the step of applying a rule 308, 310, 312 from the rule chain 304 to the network accounting data set 302 to define a group node 316. In one aspect, the rule is a match rule. In another aspect, the step of applying the rule chain to the network accounting data set 302 to construct the aggregation tree 306 includes the step of applying a set of match rules 308, 310, 312 to the network accounting data set 302 to define a hierarchy of group nodes 316 within the aggregation tree 306. The step of applying the rule chain 304 to the network accounting data set 302 to construct the aggregation tree 306 includes the step of applying an aggregation rule 314 to the group node 316 to create the aggregated network accounting data set 308.

The step of applying the rule chain 304 to the network accounting data set 302 to construct the aggregation tree 306 includes the step of applying a data manipulation rule to the network usage data. In one aspect, the method further includes the step of defining the data manipulation rule to be an adornment rule. In another aspect, the method further includes the step of defining the data manipulation rule to be a filtering rule. Other aggregation rules will become apparent to one skilled in the art after reading this application. In one aspect, the network accounting data set is a set of session data. In another aspect, the network accounting data set is a set of usage data.

In one aspect, the method further includes the step of defining a data flush interval, previously described herein. The step of storing the aggregated network accounting data set 308 includes the step of transferring the aggregated network accounting data set 308 (from volatile memory) to the data storage system 162, 164 after a period of time associated with the data flush interval. In one preferred embodiment, the method further includes the step of defining a rule within the rule chain by a Java object class, and allowing additional rule types to be added to the rule chain corresponding to the Java object class.

The following paragraphs illustrate the construction of an aggregation tree for a simple aggregation scheme example and will also be used as part of a correlation aggregation scheme example. The correlation aggregation scheme correlates usage events with session events. In this embodiment, the single aggregation scheme (an aggregation tree) is manipulated by two different rule chains. The first rule chain is used for organizing session network data NMEs and the second rule chain is for locating the appropriate session in the aggregation tree for inbound usage data NMEs. As such, FIGS. 10 through 14 illustrate the construction of a single aggregation scheme for organizing session network data NMEs. FIGS. 15 through 18 illustrate the use of the single aggregation scheme in a correlation aggregation scheme, wherein a second rule chain is applied to the same aggregation tree for correlating session network data NMEs with usage data NMEs. In further reference to FIGS. 10-18, it is also noted that other fields may be associated with each type of NME, such as a date field, but have been left out to simplify discussion. In the following examples the date is the same for all NMEs and has been omitted for readability.

Figure 10:
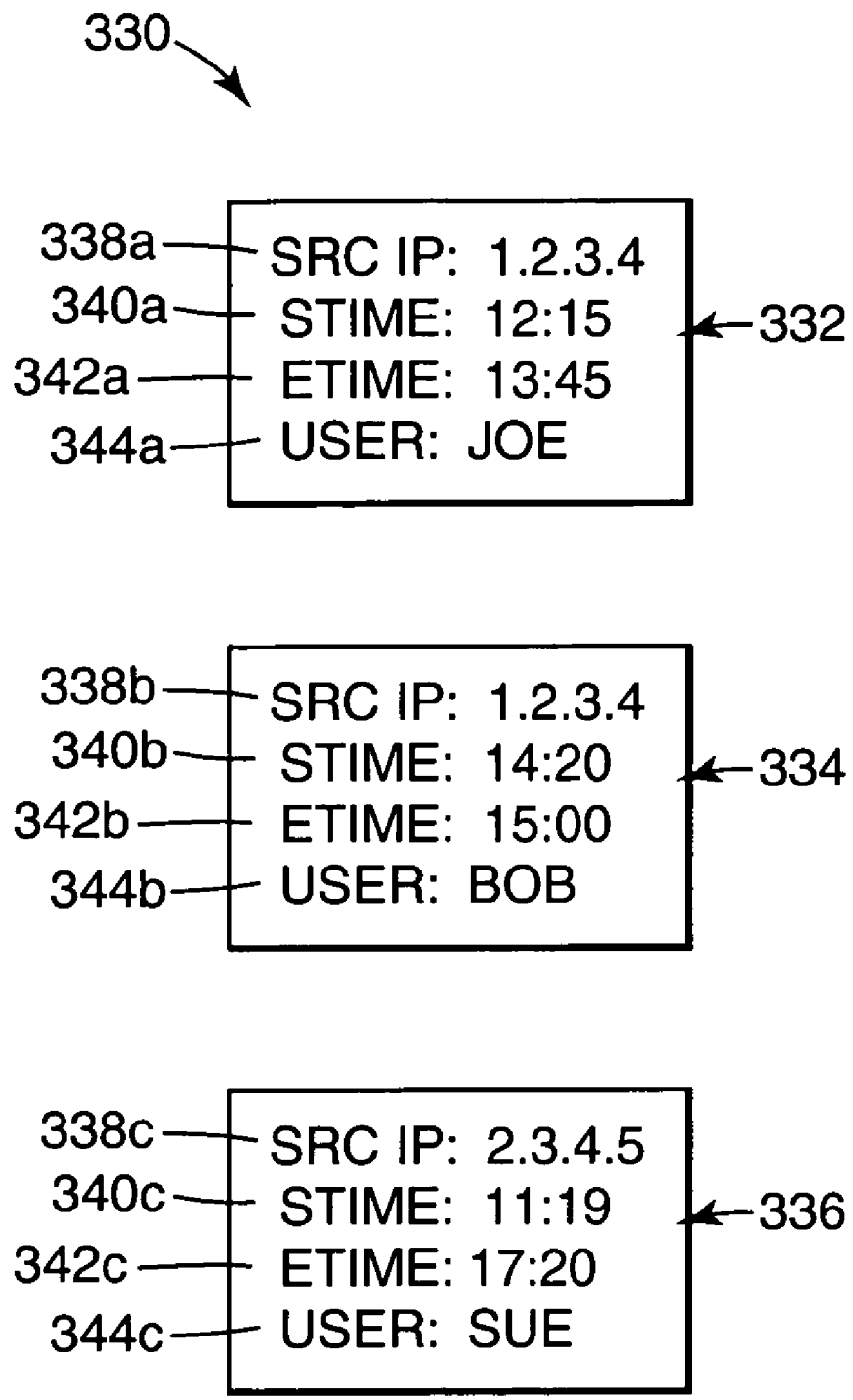
FIG. 10 is a diagram illustrating one exemplary embodiment of a group of session events.

FIG. 10 illustrates a group of session data NMEs at 330. The session data NMEs 330 include a first session data NME 332, a second session data NME 334, and a third session data NME 336. Each session data NME 330 includes four fields: a session source IP address (SRC IP) 338; a session start time (STIME) 340; a session end time (ETIME) 342; and a user name (USER) 334. In particular, first session data NME 332 includes a session source IP address 338a of 1.2.3.4, a session start time 340a of 12:15, a session end time 342a of 13:45 and a user name 344a of Joe. Second session data NME 334 includes a session source IP address 338b of 1.2.3.4, a session start time 340b of 14:20, a session end time 342b of 15:00, and a user name 344b of Bob. Third session data NME 336 includes a session source IP address 338c of 2.3.4.5, a session start time 340c of 11:19, a session end time 342c of 17:20 and a user name 344c of Sue.

Figure 11:
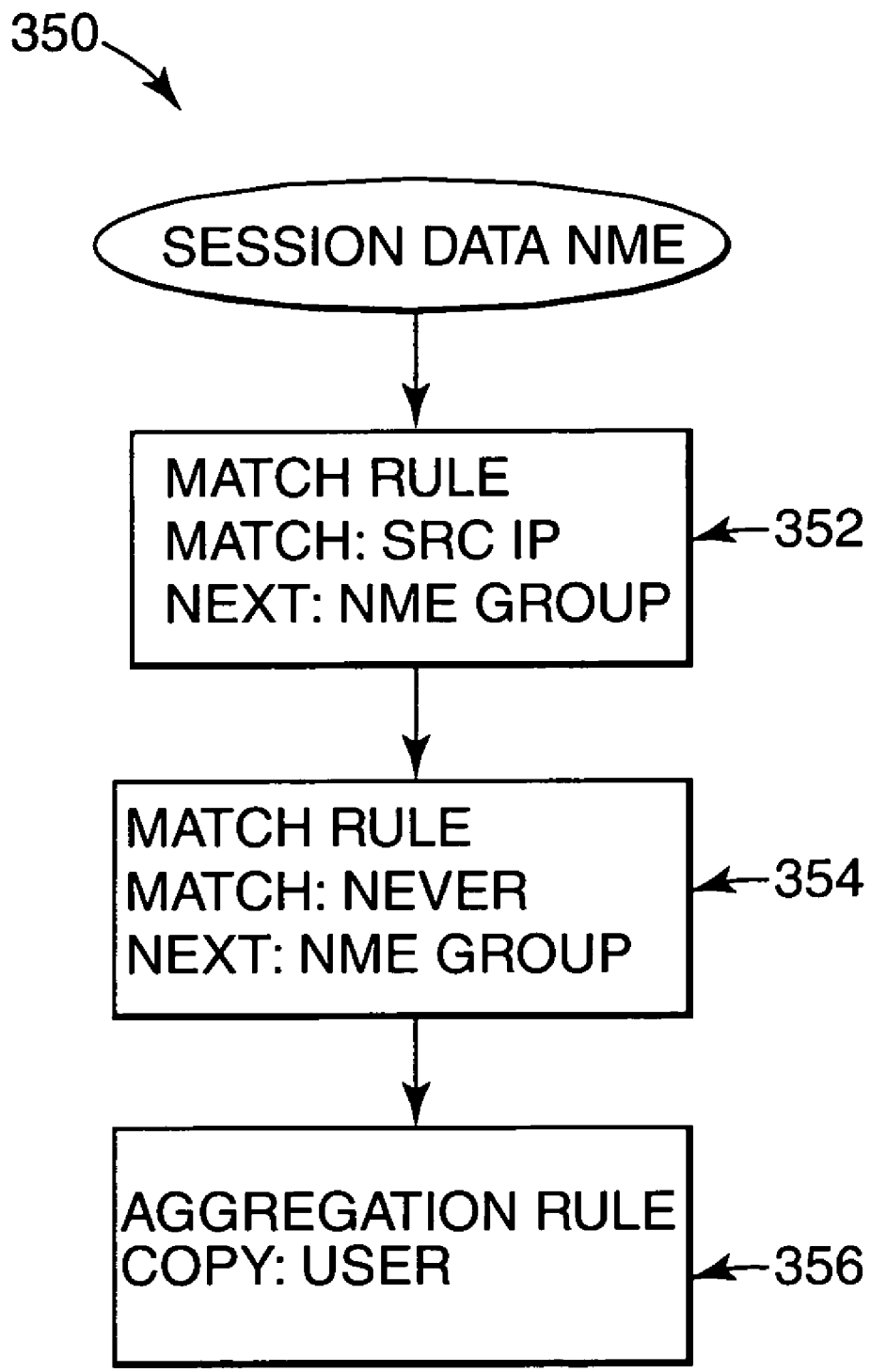
FIG. 11 is a block diagram illustrating one exemplary embodiment of a rule chain for a simple aggregation scheme used in a network usage data recording system according to the present invention.

FIG. 11 is a block diagram illustrating one exemplary embodiment of a rule chain for a simple aggregation scheme generally at 350. Rule chain 350 includes a first match rule 352, followed by a second match rule 354, followed by an aggregation rule 356. The session data NMEs, represented at 358, enter the rule chain at first match rule 352. The first match rule 352 matches the source IP address (MATCH: SRC IP) and then on to the next NME group (NEXT:NME Group). Second match rule 354 never matches (MATCH: NEVER), forcing an NME group to be created for each inbound session NME, and then on to the next NME group (NEXT:NME Group). Aggregation rule 356 is an aggregation rule. An aggregation rule is defined as a mechanism used for combining multiple inbound NMEs into a single aggregated NME. When two NMEs are combined, a list of NME fields and operations is given to control whether fields are added or subtracted or the minimum or maximum value is taken. For all other attributes the first NME to match the criteria has its values copied to the new NME and these values are unchanged when the subsequent NME are aggregated. An aggregation scheme always ends with an aggregation rule. In aggregation rule 356, the user name is copied to the aggregation tree (COPY:USER).

Figure 12:
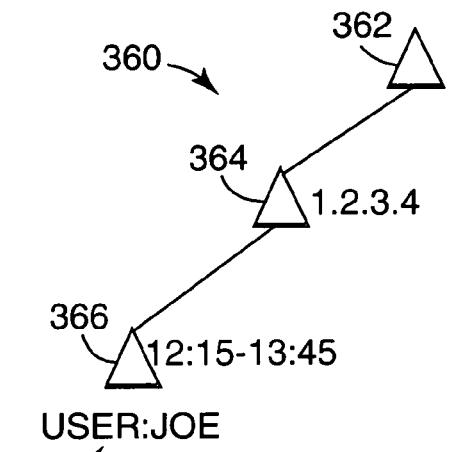
FIG. 12 is a block diagram illustrating one exemplary embodiment of a first step in construction of a simple aggregation tree used in a network usage data recording system according to the present invention.

FIG. 12 illustrates a first step in construction of the aggregation tree 328 generally at 360. First session data NME 332 is applied to rule chain 350. The aggregation tree begins at 362. The first session data NME 332 is applied to first match rule 352, which matches the session source IP address. If no Group NME exists for the session source IP address 338A, a Group NME is created for that source IP address, indicated at 364. Next, second match rule 354 never matches. As such, a Group NME is created, indicated at 366. Next, at aggregation rule 356, the user name 344a, Joe, is copied to the Group NME 366, indicated at 368.

Figure 13:
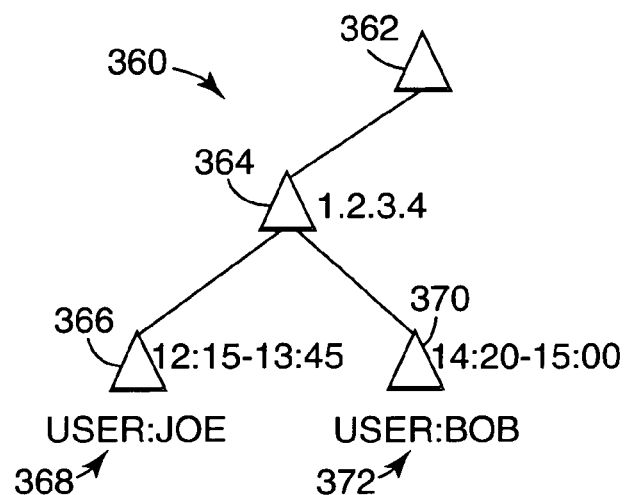
FIG. 13 is a block diagram illustrating one exemplary embodiment of a second step in construction of a simple aggregation tree used in a network usage data recording system according to the present invention.

FIG. 13 illustrates second session data NME 334 being applied to rule chain 350. First, the session source IP address 338b (1.2.3.4) is matched in the aggregation tree 360. A match is found at Group NME 364. Next, second match rule 354 is applied (never match) and a Group NME for this time range is created, indicated at 370. At aggregation rule 356, the user name 344b (Bob) is copied to the aggregation tree 362, indicated at 372.

Figure 14:
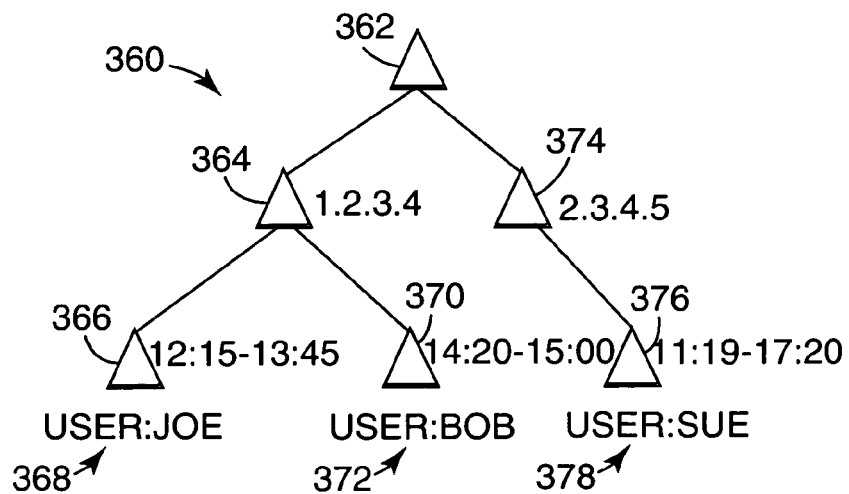
FIG. 14 is a block diagram illustrating one exemplary embodiment of a third step in construction of a simple aggregation tree used in a network usage data recording system according to the present invention.

FIG. 14 illustrates the step of the third session data NME 336 being applied to rule chain 350. At first match rule 352, the session source IP address 338c (2.3.4.5) is not found, so a new Group NME for that session source IP address is created, indicated at 374. Next, at second match rule 354 a Group NME is created, indicated at 376. At aggregation rule 356, the user name 344c (Sue) is copied, indicated at 378. The construction of the simple aggregation tree 360 is now complete.

In another embodiment, a correlation aggregation scheme is utilized wherein a single aggregation scheme (an aggregation tree) is manipulated by two different chain rules. In the exemplary embodiment shown, session data NMEs will be correlated with usage data NMEs. As such, the first part of this example has already been described in reference to FIGS. 10-14. FIGS. 15-18 illustrate the application of a second rule chain to a group of usage data NMEs as applied to the same aggregation tree 360 to construct correlation aggregation tree 361 to complete the correlation aggregation scheme.

Figure 15:
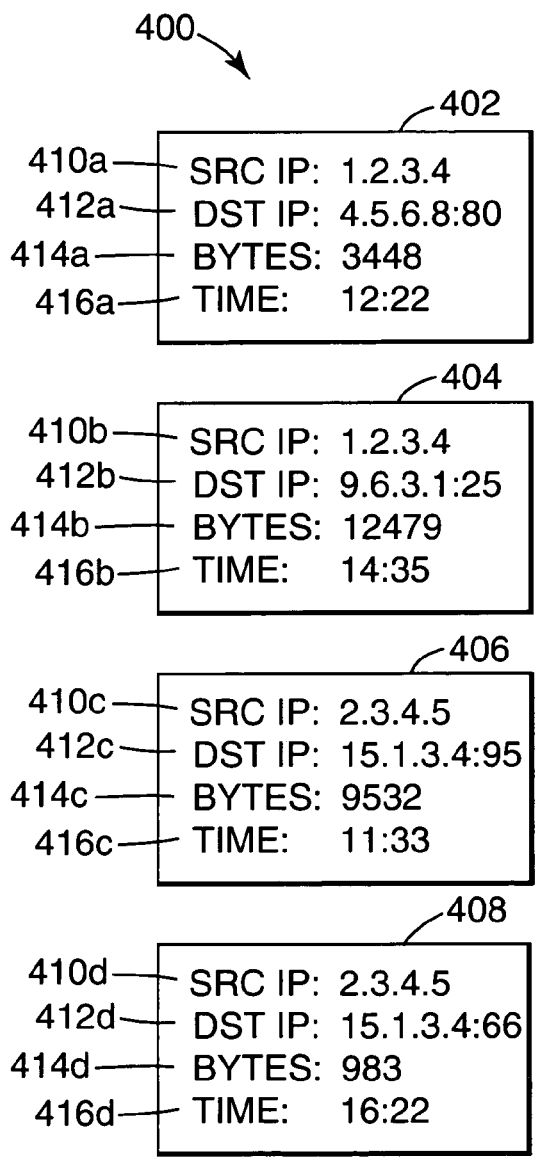
FIG. 15 is a diagram illustrating one exemplary embodiment of a group of usage events.

FIG. 15 illustrates a group of usage data NMEs 400. The usage data NMEs 400 include a first usage data NME 402, a second usage data NME 404, a third usage data 406 and a fourth usage data NME 408. Each usage data NME 400 includes four fields: a usage source IP address (SRC IP) 410; a usage destination IP address (DST IP) 412; the number of bytes transferred during the session (BYTES) 414; and the time (TIME) 416.

In particular, first usage data NME 402 includes usage source IP address 410a (1.2.3.4), usage destination IP address 412a (4.5.6.8:80), bytes 414a (3448) and time 416a (12:22). Second usage data NME 404 includes usage source IP address 410b (1.2.3.4), usage destination IP address 412b (9.6.3.1:25), bytes 414b (12479) and time 416b (14:35). Third usage data NME 406 includes usage source IP address 410c (2.3.4.5), usage destination IP address 412c (15.1.3.4:95), bytes 414c (9532) and time 416c (11:33). Fourth usage data NME 408 includes usage source IP address 410d (2.3.4.5), usage destination IP address 412d (15.1.3.4:66), bytes 414d (983) and time 416d (16:22).

Figure 16:
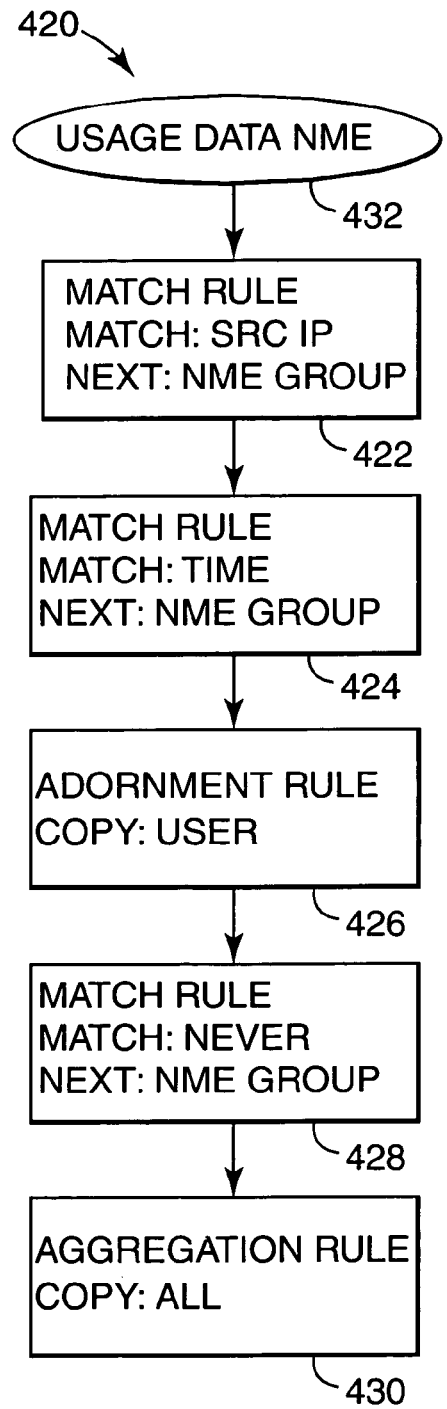
FIG. 16 is a block diagram illustrating one exemplary embodiment of a second rule chain of a correlation aggregation scheme used in a network usage data recording system according to the present invention.

FIG. 16 is a block diagram illustrating one exemplary embodiment of a second rule chain used in a correlation aggregation scheme, generally indicated at 420. The second rule chain 420 includes a first match rule 422, a second match rule 424, an adornment rule 426, a third match rule 428 and an aggregation rule 430. The usage data NMEs are first applied to the first match rule 422, indicated at 432. The first match rule 422 matches the usage source IP address to a Group NME in the aggregation tree 360, the second match rule 424 matches the time to a Group NME in the aggregation tree 360, the adornment rule 426 copies the user name, the third match rule 428 does not look for a match, and as such creates an aggregated NME node, and the aggregation rule 430 copies all of the usage data NME fields to the corresponding aggregated NME node.

Figure 17:
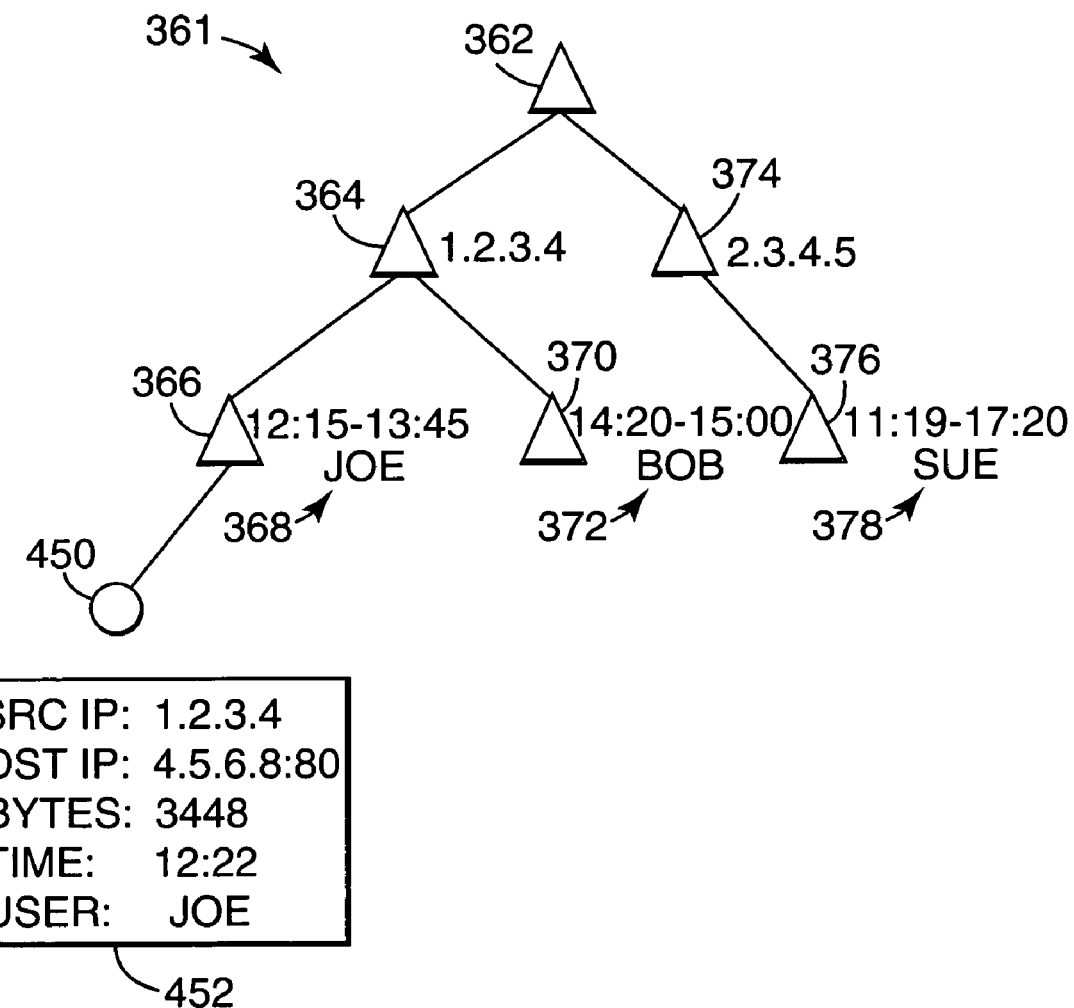
FIG. 17 is a block diagram illustrating one exemplary embodiment of a step in construction of a correlation aggregation tree used in a network usage data recording system according to the present invention.

FIG. 17 illustrates the application of first usage data NME 402 to second rule chain 420 for construction of the correlated aggregation tree 361. First match rule 422 is applied to first usage data NME 402, and a source IP address is matched at group NME 364. Next, second match rule 424 is applied to first usage data NME 402 and a time match is found at group NME 366, since time 416a (12:22) falls between the time range of 12:15 to 13:45. At adornment rule 426, the user name is copied. At match rule 428, a match never occurs, and aggregated NME node 450 is created. At aggregation rule 430, all of the fields of the first usage data NME 402 are copied, resulting in aggregated NME 452.

Figure 18:
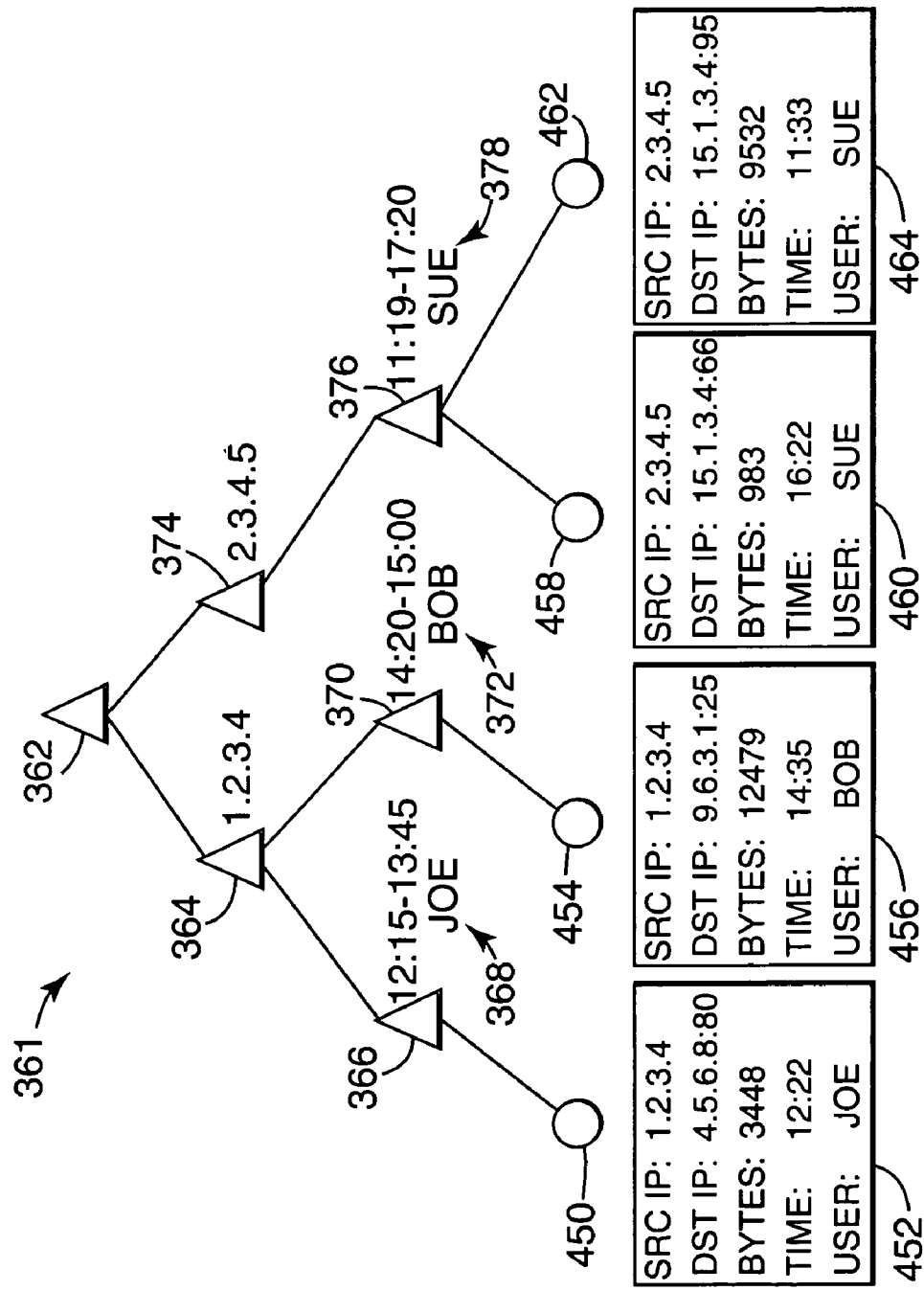
FIG. 18 is a block diagram illustrating one exemplary embodiment of a correlation aggregation tree after application of the second rule chain, used in a network usage data recording system according to the present invention.

The same process is repeated for second usage data NME 404, third usage data NME 406 and fourth usage data NME 408. FIG. 18 illustrates the resulting construction of aggregation tree 361. Aggregation tree 361 now includes aggregated NME node 454 with aggregated NME 456, aggregated NME node 458 with aggregated NME 460, and aggregated NME node 462 with aggregated NME 464.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A network usage system having a multiple level distributed data storage system, the system comprising:
    a set of first level network data collectors, wherein each first level network data collector receives network accounting data from a network data source, processes and stores the network accounting data at the first level network data collector; and
    a second level network data collector, wherein the second level network data collector receives processed network accounting data from one or more first level network data collectors, processes and stores the network accounting data at the second level network data collector; and
    wherein each first level network data collector includes a first level data storage system and the second level network data collector includes a second level data storage system, for storing processed network accounting data, wherein the first level data storage system and the second level data storage system each include a processed data storage location, a metadata storage location and an error recovery information storage location, wherein the processed network accounting data is stored at the processed data storage location.

2. The system of claim 1, further comprising a third level network data collector, wherein the third level network data collector receives processed network accounting data from the first level network data collector or the second level network data collector, processes and stores the network accounting data at the third level network data collector.

3. The system of claim 2, further comprising an application interface which receives processed network accounting data from the first level network data collector, the second level network data collector, or the third level network data collector.

4. The system of claim 1, wherein the first level network data collector includes a query manager, and wherein the second level network data collector is in communication with the first level network data collector via the query manager.

5. The system of claim 1, wherein the first level network data collector converts the network accounting data to a standard data format.

6. The system of claim 1, wherein after storing of the processed network accounting data, corresponding metadata is transferred to the metadata storage location and error recovery information is transferred to the error recovery information location.

7. The system of claim 1, wherein the first level data storage system includes a first level aging policy, wherein network accounting data is removed from the first level data storage system after a time period corresponding to the first level aging policy.

8. The system of claim 7, wherein the second level data storage system includes a second level aging policy different from the first level aging policy, wherein the network accounting data is removed from the second level data storage system after a time period corresponding to the second level aging policy.

9. A method for recording network usage including storing network data in a multiple level data storage system, the method comprising the steps of:
    defining a set of first level network data collectors;
    receiving a first set of network accounting data at each first level network data collector, processing and storing the first network accounting data set at the first level network data collector;
    defining a second level network data collector;
    receiving the first network accounting data set from one or more first level network data collectors, processing the first network accounting data set to produce a second network accounting data set, and storing the second network accounting data set at the second level network data collector;
    defining a first level aging policy for the first level network data collector; and removing the first network accounting data set from the first level network data collector to the second level network data collector after a time period corresponding to the first level aging policy.

10. The method of claim 9, further comprising the steps of:
    defining a third level network data collector; and
    receiving the second network accounting data set at the third level network data collector from the second level network data collector, processing the second network accounting data set to produce a third network accounting data set, and storing the third network accounting data set at the third level network data collector.

11. The method of claim 9, further comprising the step of defining an application interface; and receiving the second network accounting data set at the application interface.

12. The method of claim 9, further comprising the step of defining the first level network data collector to include a query manager, wherein the second level network data collector is in communication with the first level network data collector via the query manager.

13. The method of claim 9, wherein the step of processing and storing the first network accounting data set via the first level network data collector further comprises the step of converting the first network accounting data set to a standard data format.

14. The method of claim 9, further comprising the step of defining the first level network data collector to include a first level data storage system having a first processed data storage location, a metadata storage location and an error recovery information storage location, wherein the first network accounting data set is stored at the first processed data storage location.

15. The method of claim 14, further comprising the steps of transferring metadata to the metadata storage location and transferring error recovery information to the error recovery information storage location after storing the processed first network accounting data set.

16. The method of claim 9, further comprising the step of defining a second level aging policy for the second level network data collector, wherein the second level aging policy is different than the first level aging policy.

17. The method of claim 9, where processing the first network usage information set includes converting the first network usage information set to a standard data format, and aggregating the converted first network usage information set.

18. The method of claim 9, where receiving the first set of network usage information includes defining the network usage information to comprise at least one of network usage data or network session data.

19. The method of claim 9, further comprising querying the first level network data collector for the processed network usage information stored at the first level network data collector; and transferring the processed network usage information to the second level network data collector.

20. A method for recording network usage including storing network data in a multiple level data storage system, the method comprising the steps of:
  defining a set of first level network data collectors;
  receiving a first set of network usage information at each first level network data collector, processing and storing the first network usage information set at the first level network data collector;
  defining a second level network data collector;
  receiving the first network usage information set at the second level network data collector from one or more first level network data collectors, processing the first network usage information set to produce a second network usage information set, and storing the second network usage information set at the second level network data collector; and
  defining the first level network data collector to include a query manager;
    wherein the second level network data collector is in communication with the first level network data collector via the query manager.

21. A network usage system having a multiple level distributed data storage system, the system comprising:
  a set of first level network data collectors, wherein each first level network data collector receives network accounting data from a network data source, processes and stores the network accounting data at the first level network data collector, where each network data collector is configured to receive network accounting data including at least one of network usage data comprising source address, destination address, byte or packet counts and a time stamp, or network session data comprising a source address, a time stamp and a user name;
  a second level network data collector, wherein the second level network data collector receives processed network accounting data from one or more first level network data collectors, processes and stores the network accounting data at the second level network data collector;
  wherein each first level network data collector includes a first level data storage system and the second level network data collector includes a second level data storage system, for storing processed network accounting data, wherein the first level data storage system and the second level data storage system each include a processed data storage location, a meta data storage location and an error recovery information storage location, wherein the processed network accounting data is stored at the process data storage location, wherein after storing of the process network accounting data, corresponding meta data is transferred to the meta data storage location and error recovery information is transferred to the error recovery information location;
  wherein each first level network data collector includes a query manager, and wherein the second level network data collector is in communication with the first level network data collector via the query manager; and
  wherein each of the first level data storage systems include a first level aging policy, wherein network accounting data is removed from the first level data storage system after a time period corresponding to the first level aging policy, and wherein the second level data storage system includes a second level aging policy different from the first level aging policy, wherein the network accounting data is removed from the second level data storage system after a time period corresponding to the second level aging policy.

22. The system of claim 21, where each first level network data collector is configured to receive network accounting data from an Internet network data source.

23. The system of claim 21, where each first level network data collector is configured to receive network accounting data from an intranet network data source.

24. The system of claim 21, where each first level network data collector is configured to receive network accounting data from a telephony network data source.

* * * * *